United States Patent
Takata

(10) Patent No.: US 7,322,717 B2
(45) Date of Patent: Jan. 29, 2008

(54) ILLUMINATOR AND DISPLAY DEVICE USING THE SAME

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 124 days.

(21) Appl. No.: 11/002,154

(22) Filed: Dec. 1, 2004

(65) Prior Publication Data

US 2005/0122741 A1  Jun. 9, 2005

(30) Foreign Application Priority Data

Dec. 3, 2003  (JP) .............................. 2003-404815
Nov. 8, 2004  (JP) .............................. 2004-323858

(51) Int. Cl.
*F21V 4/00* (2006.01)
*F21S 4/00* (2006.01)

(52) U.S. Cl. ...................... 362/225; 362/221; 362/223; 362/260

(58) Field of Classification Search ................ 362/221, 362/29, 30, 27, 223, 225, 260
See application file for complete search history.

(56) References Cited

U.S. PATENT DOCUMENTS

| | | | |
|---|---|---|---|
| 5,235,497 A * | 8/1993 | Costa | 362/224 |
| 5,434,762 A * | 7/1995 | Shemitz | 362/225 |
| 5,975,722 A | 11/1999 | Van Duijneveldt | |
| 6,494,605 B1 | 12/2002 | Doell | |
| 6,654,088 B2 | 11/2003 | Morishita et al. | |
| 6,798,150 B2 * | 9/2004 | Moon | 315/169.3 |
| 6,857,759 B2 * | 2/2005 | Lee et al. | 362/225 |
| 6,939,020 B2 * | 9/2005 | Lim | 362/97 |
| 7,106,394 B2 | 9/2006 | Ono et al. | |
| 2002/0130628 A1 | 9/2002 | Shin | |
| 2003/0026085 A1 | 2/2003 | Ueda et al. | |

(Continued)

FOREIGN PATENT DOCUMENTS

JP    03-259177    11/1991

(Continued)

OTHER PUBLICATIONS

Yoshiki Takata, "Illumination Device and Display Apparatus Including the Same", U.S. Appl. No. 10/977,827, filed on Nov. 2, 2004.

(Continued)

*Primary Examiner*—Alan Cariaso
*Assistant Examiner*—Leah S. Lovell
(74) *Attorney, Agent, or Firm*—Keating & Bennett, LLP

(57) ABSTRACT

An illuminator for a display device is provided on a back side of a display panel, and includes a plurality of rod-shaped light sources each having a length extending in a first direction and having substantially the same length. The plurality of rod-shaped light sources include a plurality of first rod-shaped light sources arranged so as to be substantially parallel and spaced from one another in a second direction that is generally perpendicular to the first direction, and a plurality of second rod-shaped light sources arranged to be substantially parallel and spaced from one another in the second direction, each second rod-shaped light source being arranged to be collinear with and spaced in the first direction from a corresponding one of the plurality of first rod-shaped light sources.

56 Claims, 22 Drawing Sheets

U.S. PATENT DOCUMENTS

| | | |
|---|---|---|
| 2003/0035283 A1 | 2/2003 | Lim |
| 2004/0070965 A1* | 4/2004 | Lin ............................ 362/31 |
| 2004/0119418 A1 | 6/2004 | Moon |
| 2004/0140773 A1 | 7/2004 | Moon |
| 2004/0189892 A1 | 9/2004 | Ono et al. |
| 2005/0024867 A1* | 2/2005 | Witham et al. ............. 362/225 |

FOREIGN PATENT DOCUMENTS

| | | |
|---|---|---|
| JP | 04-172319 | 6/1992 |
| JP | 04-338723 A | 11/1992 |
| JP | 6-67176 | 3/1994 |
| JP | 07-151454 A | 6/1995 |
| JP | 8-194650 | 7/1996 |
| JP | 10-133026 A | 5/1998 |
| JP | 10-143089 | 5/1998 |
| JP | 10-186328 | 7/1998 |
| JP | 3069624 U | 6/2000 |
| JP | 2000-310776 | 11/2000 |
| JP | 2000-338487 A | 12/2000 |
| JP | 2001-174813 | 6/2001 |
| JP | 2001-210126 | 8/2001 |
| JP | 2002-091347 A | 3/2002 |
| JP | 2002-122863 | 4/2002 |
| JP | 2003-31003 | 1/2003 |
| JP | 2003-84277 | 3/2003 |
| JP | 2003-215585 | 7/2003 |
| JP | 2003-233071 | 8/2003 |
| JP | 2003-257205 A | 9/2003 |
| JP | 2004-296298 A | 10/2004 |
| WO | 01-79922 A1 | 10/2001 |

OTHER PUBLICATIONS

Yoshiki Takata, "Optical Material, Optical Element, Illuminator and Display Device", U.S. Appl. No. 11/012,738, filed on Dec. 15, 2004.

Yoshiki Takata, "Illumination Device and Display Apparatus Including the Same", U.S. Appl. No. 10/977,827, filed on Oct. 29, 2004.

Official communication issued in the counterpart Korean Application No. 10-2004-0093904, mailed on Dec. 14, 2006.

Official communication issued in the counterpart Japanese Application No. 2003-388205, mailed on Apr. 17, 2007.

* cited by examiner

ILLUMINATOR AND DISPLAY DEVICE USING THE SAME

BACKGROUND OF THE INVENTION

1. Field of the Invention

The present invention relates to an illuminator and a display device including such an illuminator, and more particularly, the present invention relates to an illuminator provided on the back side of a display panel and used as a backlight of a display device, and also relates to a display device including such an illuminator.

2. Description of the Related Art

Liquid crystal display devices are widely used in OA (office automation) equipment, car televisions, monitors for camcorders, etc., for their advantageous features such as lightweight, thin structure and small power consumption. Unlike self-luminous display devices such as CRTs, PDPs (plasma display panels) and EL (electroluminescence) devices, liquid crystal display devices use a liquid crystal display element that itself does not produce light. Therefore, in a transmission type liquid crystal display device, a planar illuminator called a "backlight" is provided on the back side of the liquid crystal display element, and the liquid crystal display element controls the amount of output light from the backlight to be transmitted therethrough in each pixel so as to display an image.

Backlights are generally classified into "direct-type" backlights including a plurality of rod-shaped light sources, such as fluorescent tubes, placed directly under a liquid crystal display element, and "edge light-type" backlights including a light source placed along an edge of a lightguide plate so that light from the light source is guided through the lightguide plate to a liquid crystal display element.

A typical structure of a direct-type backlight is schematically illustrated in FIG. 37 and FIG. 38. A backlight 40 illustrated in FIG. 37 and FIG. 38 is provided on the back side of a transmission type liquid crystal display panel 48, and includes a plurality of fluorescent tubes 41, a case 43 accommodating the fluorescent tubes 41, and an optical sheet (e.g., a diffusion sheet or a prism sheet) 45 placed between the fluorescent tubes 41 and the liquid crystal display panel 48. With the direct-type backlight 40, the brightness can easily be adjusted by adjusting the number of the fluorescent tubes 41 which define light sources, and a high brightness can be realized relatively easily. Thus, direct-type backlights are often used in large-size liquid crystal display devices.

In recent years, the length of a backlight fluorescent tube has been increasing along with the increase in the size of a liquid crystal display device. However, long fluorescent tubes have a poor anti-shock property and are difficult to handle. Moreover, as the length of a fluorescent tube increases, the operating voltage thereof increases significantly, whereby the reliability thereof decreases significantly in terms of the withstand voltage. Therefore, there is a technical limit to increasing the length of a fluorescent tube along with the increase in the size of a liquid crystal display device. Another problem is that a further increase in the size of a liquid crystal display device may necessitate the provision of a new production line for producing longer fluorescent tubes. Also, the cost and difficulty in manufacturing longer fluorescent tubes increase as the length of the fluorescent tubes increases.

Japanese Laid-Open Patent Publication No. 10-143089 discloses a backlight 40A including an array of fluorescent tubes 41' some of which have a different length from the others, as illustrated in FIG. 39. The fluorescent tubes 41' are arranged to be collinear along a longitudinal direction that extends along lengths of the tubes so as to form rows of tubes, and ends of the fluorescent tubes 41' are arranged in a staggered pattern in a vertically extending direction, which is perpendicular to the longitudinal direction, over the entire array. That is, ends of two longitudinally or horizontally adjacent fluorescent tubes 41' in one row overlap a central portion of a fluorescent tube 41' in a vertically adjacent row of tubes in order to provide sufficient brightness at the gaps between each pair of adjacent fluorescent tubes 41' in each row. Because this overlapping arrangement of fluorescent tubes 41' is necessary to overcome the lack of brightness at the gaps between adjacent fluorescent tubes 41', shorter fluorescent tubes 41' must be used at the ends of the rows, and thus many different size fluorescent tubes are required.

The backlight 40A disclosed in Japanese Laid-Open Patent Publication No. 10-143089, which must use fluorescent tubes of different lengths as described above, has various problems due to the use of light sources of different specifications. Where light sources of different specifications are used, there are significant electrical and optical characteristics variations among different positions across the backlight, whereby it is difficult to properly control the light emission. Also, it is expensive to manufacture and assemble different size fluorescent tubes.

SUMMARY OF THE INVENTION

In order to overcome the problems described above, preferred embodiments of the present invention provide an illuminator that can suitably be used as a backlight of a large-size display device, and a display device including such an illuminator.

An illuminator according to a preferred embodiment of the present invention includes a plurality of rod-shaped light sources each having a length extending in a first direction and having substantially the same length, wherein the plurality of rod-shaped light sources include a plurality of first rod-shaped light sources arranged to be substantially parallel with respect to one another and spaced from each other in a second direction that is substantially perpendicular to the first direction, and a plurality of second rod-shaped light sources arranged to be substantially parallel with respect to one another and spaced from each other in the second direction, each of the second rod-shaped light sources being arranged to be spaced from and collinear with a corresponding one of the plurality of first rod-shaped light sources along the first direction, and each of the first rod-shaped light sources has substantially the same length as the first rod-shaped light sources that are directly adjacent thereto in the second direction, and each of the second rod-shaped light sources has substantially the same length as the second rod-shaped light sources that are directly adjacent thereto in the second direction.

An illuminator according to another preferred embodiment of the present invention is an illuminator including a plurality of rod-shaped light sources each having a length extending in a first direction and having substantially the same length, wherein the plurality of rod-shaped light sources include a plurality of first rod-shaped light sources arranged to be substantially parallel with respect to one another and spaced from each other in a second direction that is substantially perpendicular to the first direction, and a plurality of second rod-shaped light sources arranged to be substantially parallel with respect to one another and spaced from each other in the second direction, respective end portions of a plurality of pairs of the first and second rod-shaped light sources that are directly adjacent to each other along the second direction are overlapped with each other by a certain amount along the first direction, and the overlapping end portions of the plurality of pairs of the first and second rod-shaped light sources being the only overlapping portions of the plurality of pairs of the first and second rod-shaped light sources.

In this preferred embodiment, it is preferred that the first rod-shaped light sources have first ends that are aligned with each other at a left edge portion of the illuminator and second ends that extend into the central region of the illuminator, and the second rod-shaped light sources have first ends that extend into the central region of the illuminator and second ends that are aligned with each other at a right edge of the illuminator.

The first rod-shaped light sources are preferably arranged in a first half of the illuminator and the second rod-shaped light sources are preferably arranged in a second half of the illuminator, and a central region of the illuminator being disposed between the first and second halves of the illuminator.

At least one inverter, and more preferably, a plurality of inverters are disposed in the central region. The plurality of inverters are preferably provided between the plurality of first rod-shaped light sources and the plurality of second rod-shaped light sources to operate the plurality of first rod-shaped light sources and the plurality of second rod-shaped light sources.

It is preferred that at least two of the plurality of rod-shaped light sources are electrically connected to each of the plurality of inverters. In addition, the at least two rod-shaped light sources electrically connected to each of the plurality of inverters preferably include two rod-shaped light sources electrically connected in series or in parallel with each other.

It is also preferred that a potential applied by the at least one inverter to ends of the plurality of first rod-shaped light sources on one side that is closer to the plurality of second rod-shaped light sources and a potential applied by the at least one inverter to ends of the plurality of second rod-shaped light sources on one side that is closer to the plurality of first rod-shaped light sources are substantially the same.

The first rod-shaped light sources preferably have first ends that are aligned with each other at a left edge portion of the illuminator and second ends that are aligned with each other at the central region of the illuminator, and the second rod-shaped light sources have first ends that are aligned with each other at the central region of the illuminator and second ends that are aligned with each other at a right edge of the illuminator.

It is preferable that all of the rod-shaped light sources contained in the illuminator have exactly the same length.

The illuminator also preferably includes a first supporting member arranged to support ends of the plurality of first rod-shaped light sources on one side that is closer to the plurality of second rod-shaped light sources and a second supporting member arranged to support ends of the plurality of second rod-shaped light sources on one side that is closer to the plurality of first rod-shaped light sources, wherein the first supporting member and the second supporting member are each made of a light-transmitting material.

The illuminator also preferably includes a light-scattering member that is arranged between the plurality of first rod-shaped light sources and the plurality of second rod-shaped light sources.

Each of the plurality of rod-shaped light sources is preferably a fluorescent tube.

The illuminator also preferably includes a first light-scattering member provided between two adjacent ones of the plurality of first rod-shaped light sources, and a second light-scattering member provided between two adjacent ones of the plurality of second rod-shaped light sources.

The first light-scattering member preferably is located generally in a middle region between the two first rod-shaped light sources, and the second light-scattering member is located generally in a middle region between the two second rod-shaped light sources.

The first light-scattering member and the second light-scattering member are preferably rod-shaped members. Also, it is preferable that the first light-scattering member is arranged to be substantially parallel to the plurality of first rod-shaped light sources, and the second light-scattering member is arranged to be substantially parallel to the plurality of second rod-shaped light sources.

A central axis of the first light-scattering member is preferably substantially coplanar with central axes of the plurality of first rod-shaped light sources, and a central axis of the second light-scattering member is preferably substantially coplanar with central axes of the plurality of second rod-shaped light sources.

The first light-scattering member preferably has substantially the same outer diameter as that of the plurality of first rod-shaped light sources, and the second light-scattering member preferably has substantially the same outer diameter as that of the plurality of second rod-shaped light sources.

A shape of a cross section of the first light-scattering member in the second direction preferably is generally the same as that of each of the plurality of first rod-shaped light sources, and a shape of a cross section of the second light-scattering member in the second perpendicular to the first direction preferably is generally the same as that of each of the plurality of second rod-shaped light sources.

It is preferred that the shape of a cross section of the first light-scattering member in the second direction and that of the second light-scattering member are generally circular.

It is preferred that the plurality of first rod-shaped light sources are spaced from one another in the second direction by a constant pitch P, and the plurality of second rod-shaped light sources are preferably spaced from one another in the second direction by the pitch P.

It is also preferable that each of the plurality of pairs of the first and second rod-shaped light sources that are directly adjacent to each other along the second direction are spaced from each other in the second direction by an amount that is substantially equal to one half of the pitch P.

An amount of overlap of the respective end portions of each the plurality of the first and second rod-shaped light sources that are directly adjacent to each other along the second direction is preferably less than the length of each of the plurality of first rod-shaped light sources.

Each of the plurality of rod-shaped light sources preferably includes a light-emitting region where light is emitted and two non-light-emitting regions where light is not substantially emitted, the non-light-emitting regions being adjacent respectively to opposite ends of the light-emitting region, and the non-light-emitting regions of the plurality of first rod-shaped light sources on one side that is closer to the plurality of second rod-shaped light sources are not facing the non-light-emitting regions of the plurality of second rod-shaped light sources on one side that is closer to the plurality of first rod-shaped light sources.

It is preferred that a boundary between the light-emitting regions of the plurality of first rod-shaped light sources and the non-light-emitting regions thereof on one side that is closer to the plurality of second rod-shaped light sources is substantially collinear along the second direction with a boundary between the light-emitting regions of the plurality of second rod-shaped light sources and the non-light-emitting regions thereof on one side that is closer to the plurality of first rod-shaped light sources.

In another preferred embodiment of the present invention, an illuminator includes a plurality of rod-shaped light sources each having a length extending in a first direction and having substantially the same length, the plurality of rod-shaped light sources include a plurality of first rod-shaped light sources arranged to be substantially parallel with respect to one another and spaced from each other in a second direction that is substantially perpendicular to the first direction, and a plurality of second rod-shaped light sources arranged to be substantially parallel with respect to one another and spaced from each other in the second direction, the first rod-shaped light sources having ends aligned along the second direction at a first edge of the illuminator and a remaining portion of the first rod-shaped light sources extending along the first direction toward a central region of the illuminator, the second rod-shaped light sources having ends aligned along the second direction at a second edge of the illuminator and a remaining portion of the second rod-shaped light sources extending along the first direction toward the central region of the illuminator, and at least one inverter disposed in the central region of the illuminator.

Each of the second rod-shaped light sources is preferably spaced from and collinear with a corresponding one of the plurality of first rod-shaped light sources along the first direction.

Each of the first rod-shaped light sources preferably has substantially the same length as the first rod-shaped light sources that are directly adjacent thereto in the second direction, and each of the second rod-shaped light sources has substantially the same length as the second rod-shaped light sources that are directly adjacent thereto in the second direction.

It is further preferred that additional ends of the first rod-shaped light sources are aligned at the central region of the illuminator, and additional ends of the second rod-shaped light sources are aligned at the central region and spaced from the additional ends of the first rod-shaped light sources along the first direction.

It is also preferred that all of the rod-shaped light sources contained in the illuminator have exactly the same length.

Also, it is preferable that additional end portions of a plurality of pairs of the first and second rod-shaped light sources that are directly adjacent to each other along the second direction are overlapped with each other by a certain amount along the first direction, and the overlapping end portions of the plurality of pairs of the first and second rod-shaped light sources being the only overlapping portions of the plurality of pairs of the first and second rod-shaped light sources.

In yet another preferred embodiment of the present invention, an illuminator for a display device includes a plurality of rod-shaped light sources each having a length extending in a first direction, the plurality of rod-shaped light sources include a plurality of first rod-shaped light sources arranged to be substantially parallel with respect to one another and spaced from each other in a second direction that is substantially perpendicular to the first direction, and a plurality of second rod-shaped light sources arranged to be substantially parallel with respect to one another and spaced from each other in the second direction, the first rod-shaped light sources having ends aligned along the second direction at a first edge of the illuminator and a remaining portion of the first rod-shaped light sources extending along the first direction toward a central region of the illuminator, the second rod-shaped light sources having ends aligned along the second direction at a second edge of the illuminator and a remaining portion of the second rod-shaped light sources extending along the first direction toward the central region of the illuminator, and all of the rod-shaped light sources contained in the illuminator have substantially the same length.

In this preferred embodiment, it is preferred that each of the second rod-shaped light sources is spaced from and collinear with a corresponding one of the plurality of first rod-shaped light sources along the first direction.

Also, it is preferable that additional ends of the first rod-shaped light sources are aligned at the central region of the illuminator, and additional ends of the second rod-shaped light sources are aligned at the central region and spaced from the additional ends of the first rod-shaped light sources along the first direction.

Also, it is preferable that additional end portions of a plurality of pairs of the first and second rod-shaped light sources that are directly adjacent to each other along the second direction are overlapped with each other by a certain amount along the first direction, and the overlapping end portions of the plurality of pairs of the first and second rod-shaped light sources being the only overlapping portions of the plurality of pairs of the first and second rod-shaped light sources.

It is also preferable that this illuminator includes at least one inverter disposed in the central region of the illuminator.

As a result of the unique structure and arrangement of the various preferred embodiments of the present invention as described above, short rod-shaped light sources with a lower operating voltage, a better handling property and a better anti-shock property than longer rod-shaped light sources can be used as the first and second rod-shaped light sources.

Also, planar lighting can be provided by using only rod-shaped light sources of substantially the same length, and it is not necessary to provide additional rod-shaped light sources of a different length. Therefore, electrical and optical characteristics variations among different positions across the backlight are minimized, whereby it is possible to easily control the light emission.

Also, the uniformity and the brightness of the output light is greatly improved in the illuminator according to various preferred embodiments of the present invention.

Other elements, features, characteristics and advantages of the present invention will become more apparent from the following detailed description of preferred embodiments thereof with reference to the attached drawings.

DETAILED DESCRIPTION OF THE PREFERRED EMBODIMENTS

Preferred embodiments of the present invention will now be described with reference to the drawings. Note that the present invention is not limited to the following preferred embodiments.

First Preferred Embodiment

Figure 1:
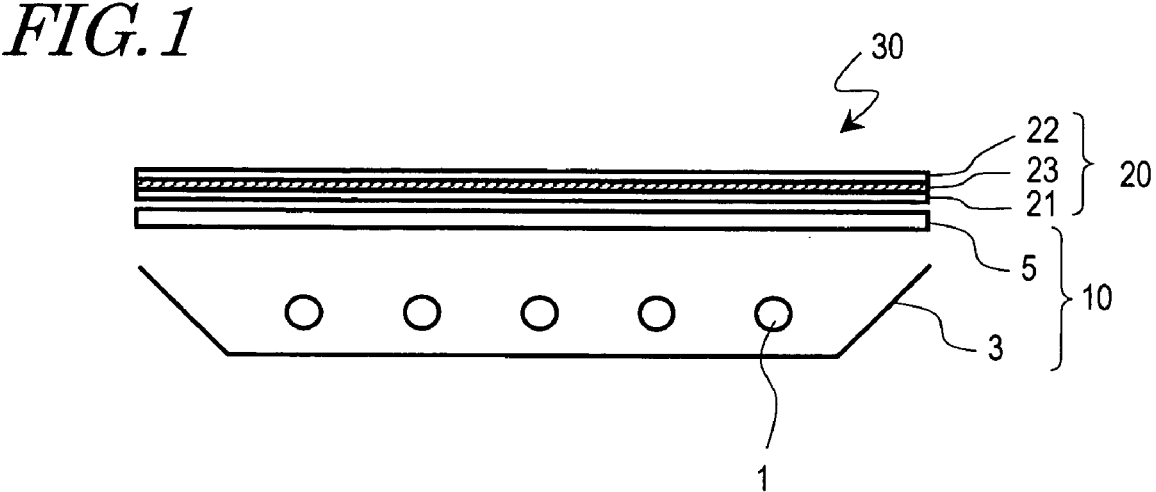
FIG. 1 is a cross-sectional view schematically illustrating a liquid crystal display device 30 including an illuminator 10 according to a preferred embodiment of the present invention.
Figure 2:
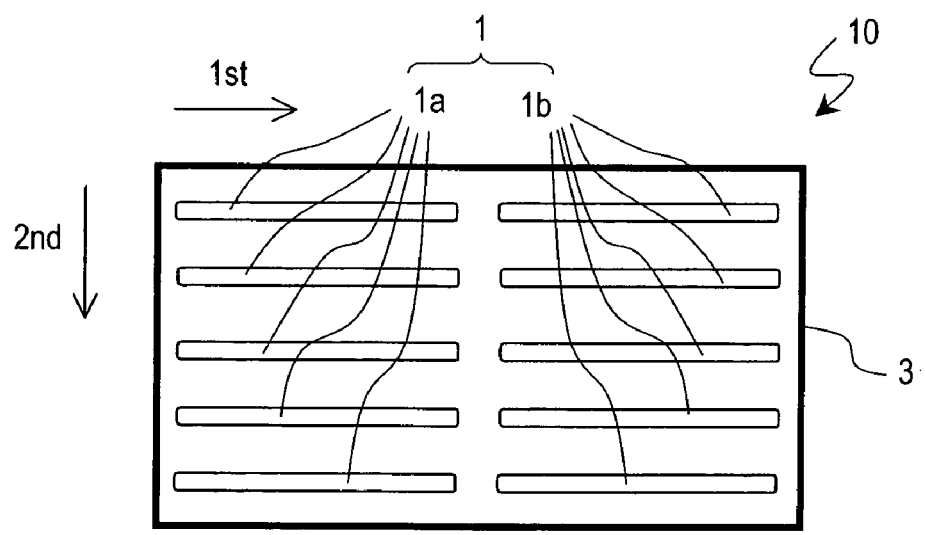
FIG. 2 is a plan view schematically illustrating the illuminator 10 according to a preferred embodiment of the present invention.

Referring to FIG. 1 and FIG. 2, an illuminator 10 of the present preferred embodiment will now be described. FIG. 1 is a cross-sectional view schematically illustrating a liquid crystal display device 30 including the illuminator 10, and FIG. 2 is a plan view schematically illustrating the illuminator 10.

The illuminator 10 is a so-called "backlight" provided on the back side (the side away from the viewer) of a liquid crystal display panel 20, as illustrated in FIG. 1. The liquid crystal display panel 20 includes a pair of substrates (e.g., glass substrates) 21 and 22 and a liquid crystal layer 23 provided therebetween, and modulates light output from the illuminator 10 to display an image. The liquid crystal display panel 20 includes a region in each pixel in which an image is displayed in a transmission mode. Thus, the liquid crystal display panel 20 is preferably a transmission type or transmission-reflection type liquid crystal display panel.

As illustrated in FIG. 1 and FIG. 2, the illuminator 10 includes a plurality of rod-shaped light sources 1 each having a length extending in a predetermined longitudinal direction (herein referred to as the "first direction"). The rod-shaped light sources 1 preferably have the same length, and the illuminator 10 preferably includes no rod-shaped light sources 1 having different lengths. In the present preferred embodiment, the rod-shaped light sources 1 are preferably cold cathode fluorescent tubes (CCFTs). Of course, the rod-shaped light sources 1 are not limited to the cold cathode fluorescent tubes. Alternatively, the rod-shaped light sources 1 may be hot cathode fluorescent lamps (HCFLS) or external electrode fluorescent lamps (EEFLs) or other suitable light sources.

The rod-shaped light sources 1 are held in a case 3 by supporting members (holders; not shown) provided in the case 3, and an optical sheet 5 is provided between the rod-shaped light sources 1 and the liquid crystal display panel 20, as illustrated in FIG. 1. The optical sheet 5 may be, for example, a diffusion sheet or a prism sheet. Note that while only one optical sheet 5 is shown in FIG. 1, a diffusion sheet, a prism sheet, etc., are used in combination in practice. Typically, in order to increase the light efficiency, the surface of the case 3 that is closer to the rod-shaped light sources 1 is provided with a highly-reflective member (e.g., a light-reflecting sheet), or the case 3 itself is made of a highly-reflective material.

Referring to FIG. 2, the arrangement of the rod-shaped light sources 1 will now be described in greater detail.

As shown on the left side of FIG. 2, the illuminator 10 includes a plurality of first rod-shaped light sources 1a arranged in a first portion (left portion in FIG. 2) of the illuminator 10. The rod-shaped light sources 1a of the first rod-shaped light sources are arranged to be substantially parallel to each other and spaced from each other in a direction that is generally perpendicular to the first direction (herein referred to as the "second direction"). Since the rod-shaped light sources 1a having the same length are arranged to be substantially parallel to each other and spaced from each other in the second direction, they are aligned with one another with respect to the longitudinal direction (first direction) such that first (left) ends of the rod-shaped light sources 1a are aligned at the left edge portion of the illuminator 10 and second (right) ends of the rod-shaped light sources 1a are aligned at a central portion of the illuminator 10.

As shown on the right side of FIG. 2, the illuminator 10 further includes a plurality of second rod-shaped light sources 1b arranged in a second portion (right portion in FIG. 2) of the illuminator 10. Each of the plurality of rod-shaped light sources 1b of the second rod-shaped light sources is preferably arranged to extend along the same line along which the length of a corresponding one of the rod-shaped light sources 1a of the first rod-shaped light sources extends, in the first direction. That is, each of the rod-shaped light sources 1b of the second rod-shaped light sources is preferably collinear with the corresponding one of the rod-shaped light sources 1a of the first rod-shaped light sources in the first direction. Since the rod-shaped light sources 1b having the same length are arranged to be substantially parallel to each other and spaced from each other in the second direction, they are aligned with one another with respect to the longitudinal direction (first direction) such that first (left) ends of the rod-shaped light sources 1b are aligned at the central portion of the illuminator 10 and second (right) ends of the rod-shaped light sources 1b are aligned at a right edge portion of the illuminator 10.

Thus, the illuminator 10 includes the rod-shaped light sources 1a arranged in a comb-tooth pattern and the rod-shaped light sources 1b also arranged in a comb-tooth pattern with each rod-shaped light source 1a preferably being arranged so as to be collinear with and longitudinally aligned in the second direction with the corresponding rod-shaped light source 1b. For the sake of simplicity, the rod-shaped light sources 1a will hereinafter be referred to also as the "first rod-shaped light sources" (or simply as "first light sources"), and the rod-shaped light sources 1b, which are preferably arranged collinearly with the first rod-shaped light sources 1a, will hereinafter be referred to also as the "second rod-shaped light source" (or simply as "second light source").

As described above, in the illuminator 10 of the present preferred embodiment, each second rod-shaped light source 1b is preferably arranged to be collinear with and longitudinally aligned in the first direction with the corresponding first rod-shaped light source 1a, whereby shorter rod-shaped light sources with a lower operating voltage, a better handling property and a better anti-shock property than longer rod-shaped light sources can be used as the rod-shaped light sources 1. Moreover, since the rod-shaped light sources 1, including each of those in the first rod-shaped light sources 1a and the second rod-shaped light sources 1b, all have the same length, the illuminator 10 has little or no electrical and optical characteristics variations among different positions across illuminator 10, and it is possible to easily control the light emission. Also, the equal length rod-shaped light sources 1a and 1b are much easier and cheaper to manufacture and assemble in the illuminator 10.

Moreover, with the illuminator 10 of various preferred embodiments of the present invention, it is possible to realize a desirable light distribution that cannot be realized with a conventional direct-type backlight. This will be described below in greater detail.

Figure 3A:
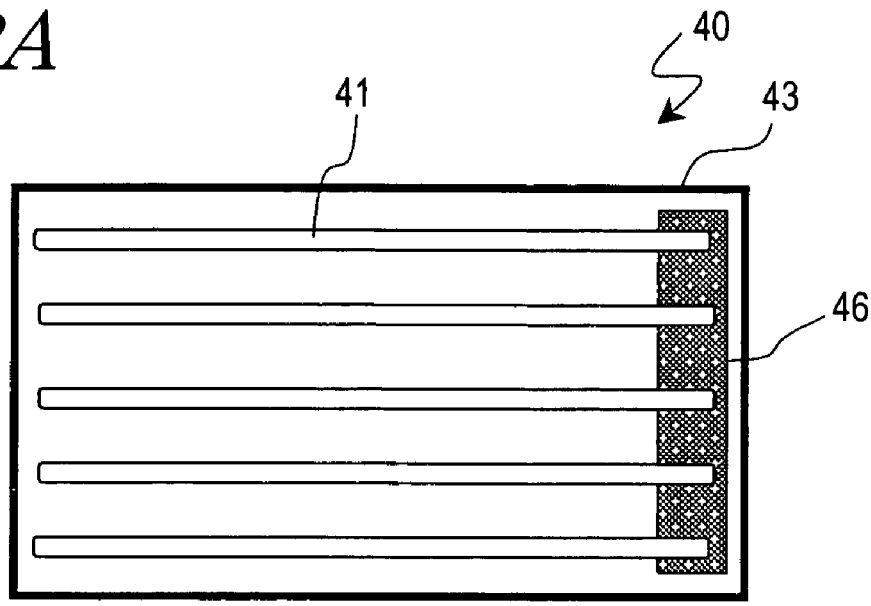
FIG. 3A and FIG. 3B schematically illustrate an inverter arrangement in a conventional direct-type backlight 40, and FIG. 3C schematically illustrates the brightness distribution for the arrangement illustrated in FIG. 3A and FIG. 3B.
Figure 3B:
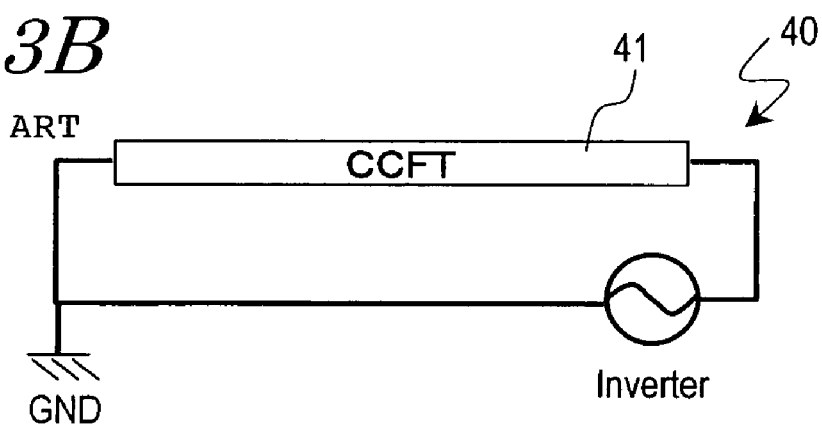
Figure 3C:
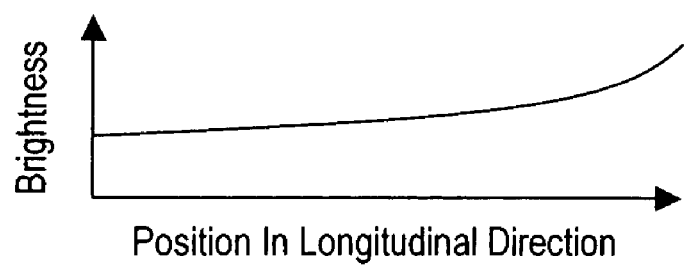

Referring to FIG. 3A and FIG. 3B, a conventional direct-type backlight 40 includes an inverter substrate 46 near one end of a cold cathode fluorescent tube 41. The inverter substrate 46 includes an inverter for generating a high voltage for operating the cold cathode fluorescent tube 41. With such an arrangement, the cold cathode fluorescent tube 41 gives a higher brightness toward one end thereof near the inverter and a lower brightness toward the other (typically grounded) end thereof that is spaced away from the inverter. Thus, the backlight 40 gives an asymmetric light distribution as illustrated in FIG. 3C.

Figure 4A:
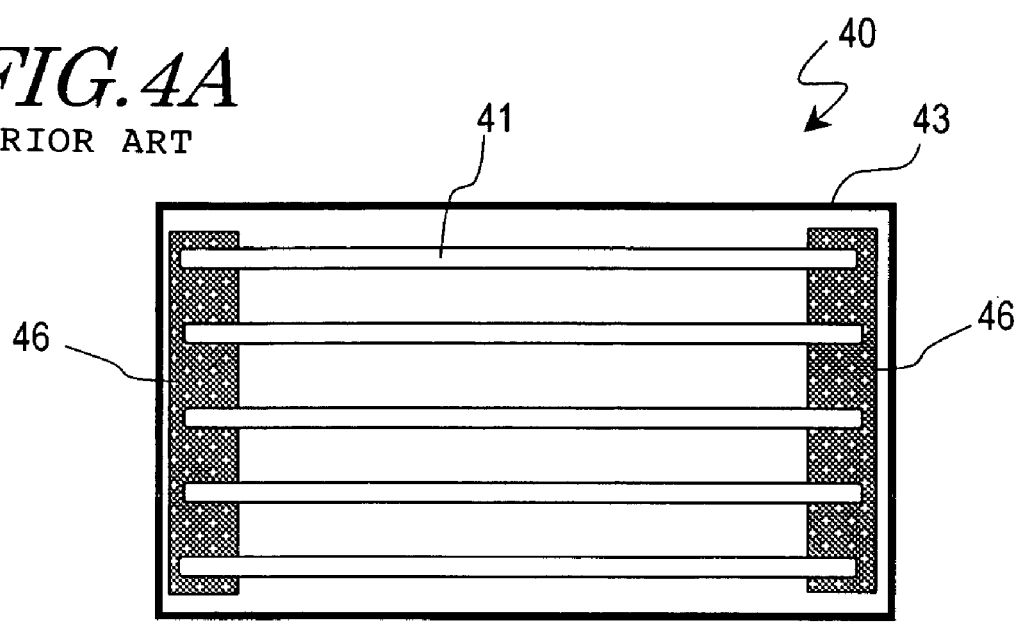
FIG. 4A and FIG. 4B schematically illustrate another inverter arrangement in the conventional direct-type backlight 40, and FIG. 4C schematically illustrates the brightness distribution for the arrangement illustrated in FIG. 4A and FIG. 4B.
Figure 4B:
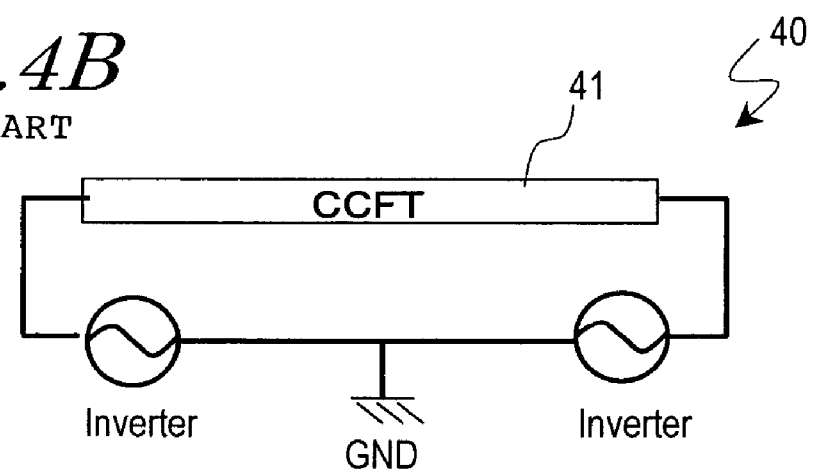
Figure 4C:
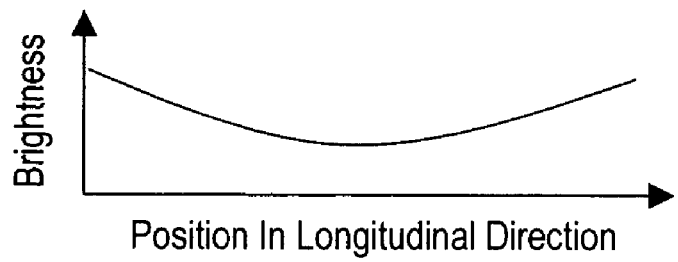

In view of this, a method has been proposed in the art in which the inverter substrate 46 is provided near each end of the cold cathode fluorescent tube 41, as illustrated in FIG. 4A and FIG. 4B, and a high voltage is applied alternately to the opposite ends of the cold cathode fluorescent tube 41. With this method, a high brightness is obtained near each end of the cold cathode fluorescent tube 41, and the backlight 40 gives a symmetric light distribution as illustrated in FIG. 4C. With this method, however, the brightness is low near the center as illustrated in FIG. 4C.

Figure 5A:
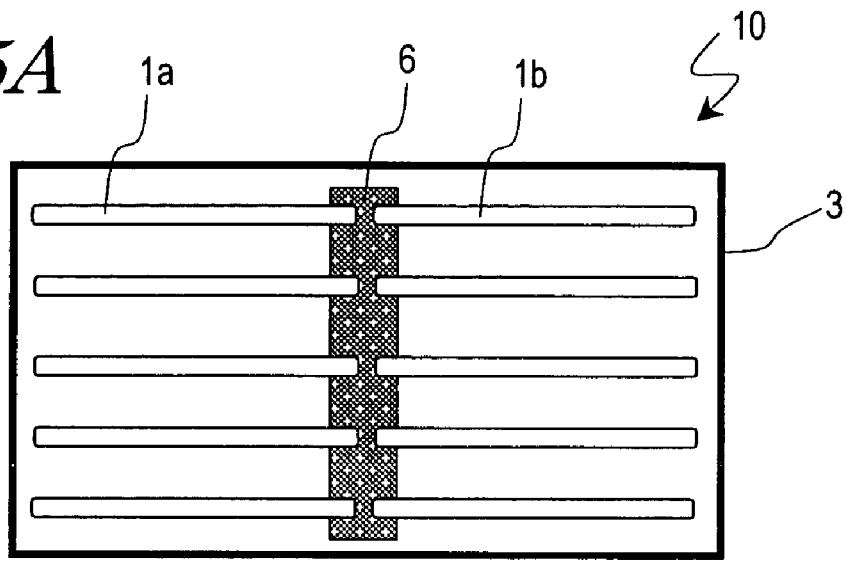
FIG. 5A and FIG. 5B schematically illustrate a preferred inverter arrangement in the illuminator 10 according to a preferred embodiment of the present invention, and FIG. 5C schematically illustrates the brightness distribution for the arrangement illustrated in FIG. 5A and FIG. 5B.
Figure 5B:
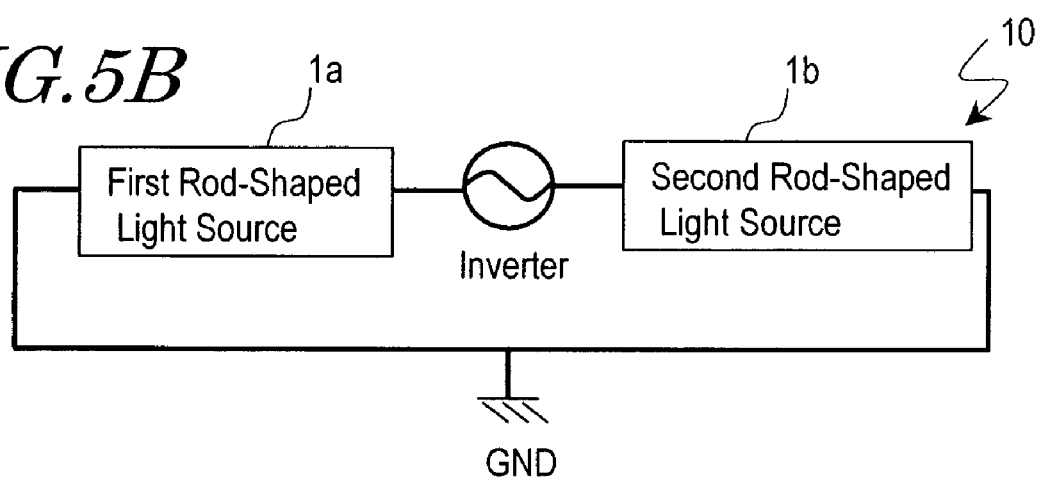
Figure 5C:
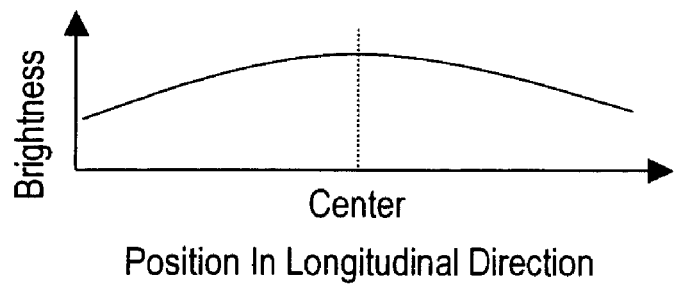

In contrast, the illuminator 10 of various preferred embodiments of the present invention preferably includes an inverter substrate 6 disposed between the first light sources 1a and the second light sources 1b (more specifically, disposed in a region located between the light sources 1a and 1b), as illustrated in FIG. 5A and FIG. 5B, the inverter substrate 6 preferably including a plurality of inverters for operating the first and second light sources 1a and 1b. Thus, it is possible to realize a symmetric light distribution with the brightness being high near the center as illustrated in FIG. 5C. The light distribution as illustrated in FIG. 5C cannot be realized with a conventional direct-type backlight, and is a much more preferable light distribution for a backlight for use in a display device.

Moreover, in the illuminator 10 of various preferred embodiments of the present invention, the rod-shaped light sources 1 having a small length can be used, whereby it is possible to reduce the voltage required for operating each rod-shaped light source 1. Therefore, a single inverter can be shared among a plurality of rod-shaped light sources 1, and it is possible to reduce the cost by eliminating components such as transformers. An arrangement having a shared inverter will now be described.

Figure 6A:
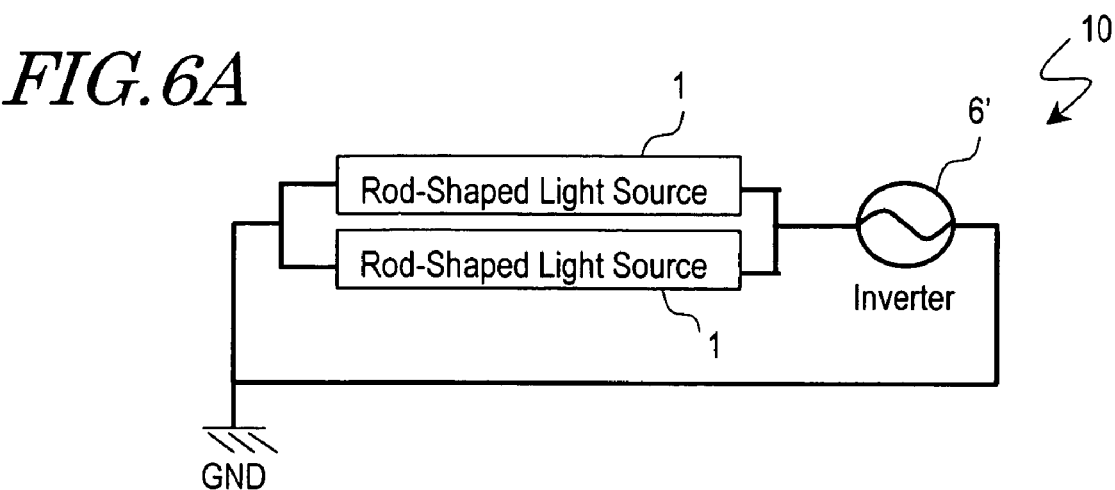
FIG. 6A, FIG. 6B and FIG. 6C schematically illustrate an exemplary arrangement where each inverter is shared in the illuminator 10 according to a preferred embodiment of the present invention.

FIG. 6A illustrates an exemplary arrangement where each inverter is shared. In the arrangement of FIG. 6A, two rod-shaped light sources 1 are electrically connected to one inverter 6', and the two rod-shaped light sources 1 are electrically connected in parallel to each other.

Figure 6B:
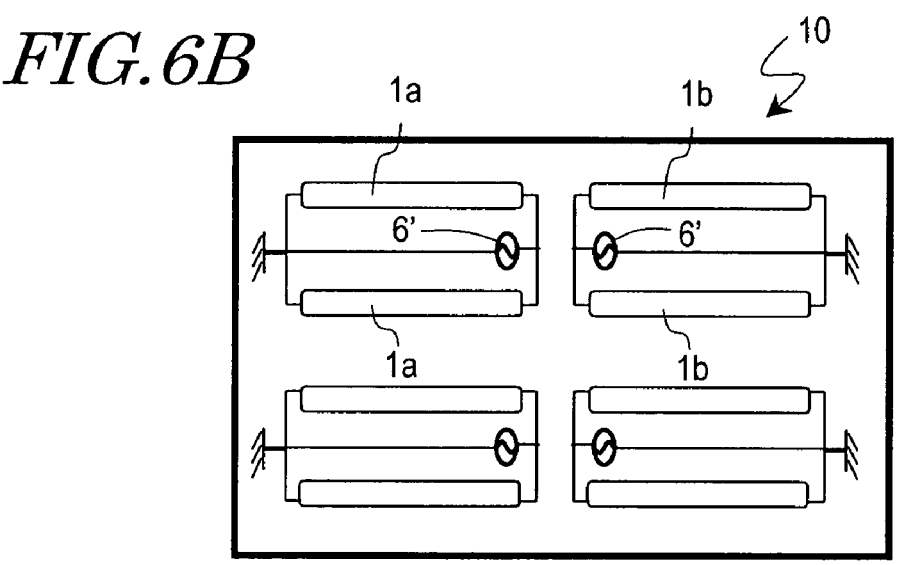
Figure 6C:
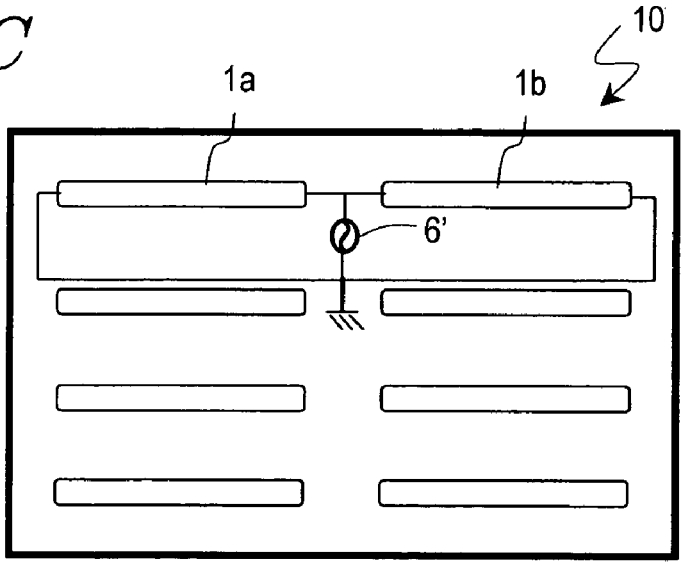

Exemplary arrangements of this type are shown in the form of wiring diagrams in FIG. 6B and FIG. 6C. In the arrangement illustrated in FIG. 6B, each pair of two vertically adjacent first light sources 1a are electrically connected to one inverter 6', and the two first light sources 1a are electrically connected in parallel to each other. Moreover, each pair of two vertically adjacent second light sources 1b are electrically connected to one inverter 6', and the two second light sources 1b are electrically connected in parallel to each other. In the arrangement illustrated in FIG. 6C, each pair of one first light source 1a and one second light source 1b horizontally adjacent to each other are electrically connected to one inverter 6', and the pair of first and second light sources 1a and 1b are electrically connected in parallel to each other.

When two rod-shaped light sources 1 are electrically connected in parallel to each other, as illustrated in FIG. 6A, FIG. 6B and FIG. 6C, the two rod-shaped light sources 1 connected in parallel to each other receive voltages of the same period and the same phase from the inverter 6', thereby realizing a simple operation of the light sources without requiring a phase control.

Figure 7A:
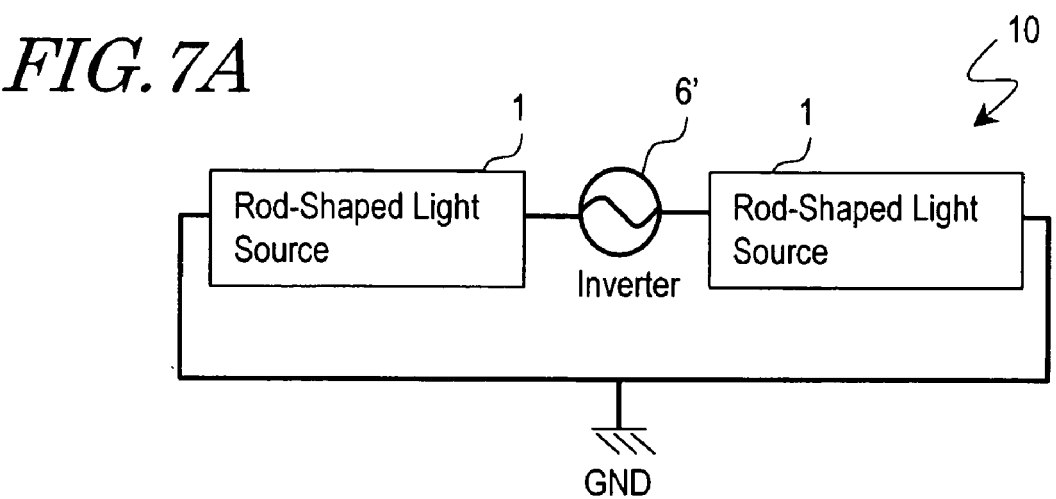
FIG. 7A, FIG. 7B and FIG. 7C each schematically illustrate another exemplary arrangement where each inverter is shared in the illuminator 10 according to a preferred embodiment of the present invention.

FIG. 7A illustrates another exemplary arrangement where each inverter is shared. In the arrangement illustrated in FIG. 7A, each pair of two rod-shaped light sources 1 are electrically connected to one inverter 6', and the two rod-shaped light sources 1 are electrically connected in series with each other.

Figure 7B:
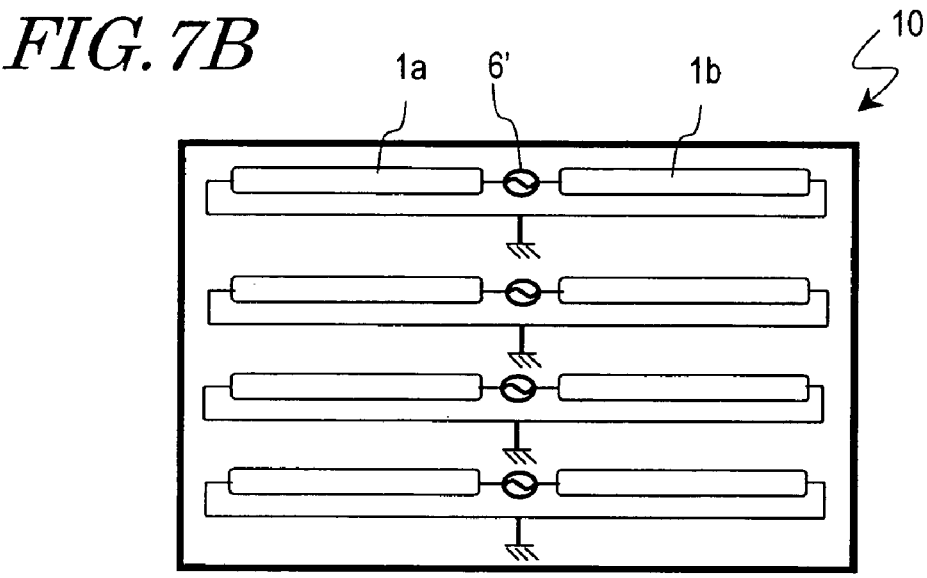
Figure 7C:
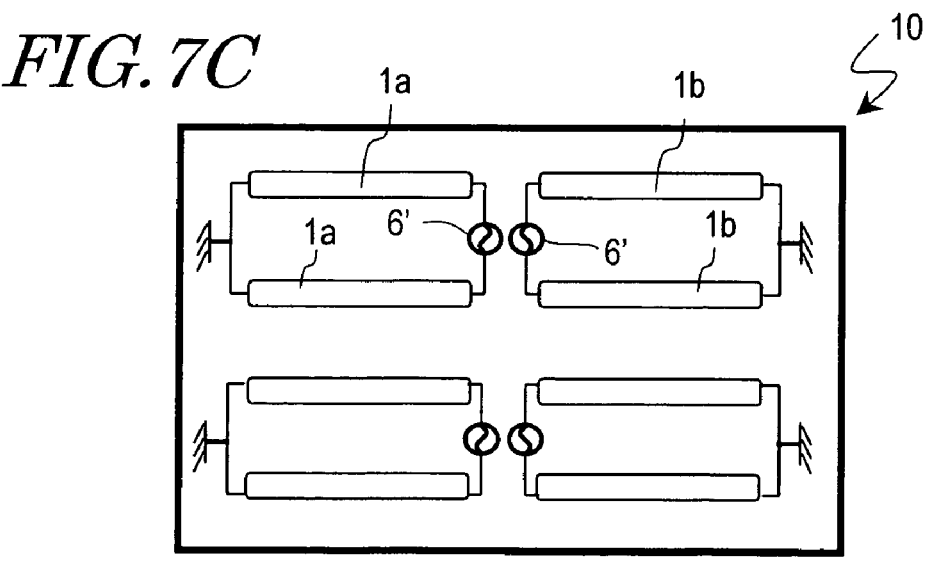

Exemplary arrangements of this type are shown in the form of wiring diagrams in FIG. 7B and FIG. 7C. In the arrangement illustrated in FIG. 7B, each pair of one first light source 1a and one second light source 1b horizontally adjacent to each other are electrically connected to one inverter 6', and the pair of first and second light sources 1a and 1b are electrically connected in series with each other. In the arrangement illustrated in FIG. 7C, each pair of two first light sources 1a vertically adjacent to each other are electrically connected to one inverter 6', and the two first light sources 1a are electrically connected in series with each other. Moreover, each pair of two second light sources 1b vertically adjacent to each other are electrically connected to one inverter 6', and the two second light sources 1b are electrically connected in series with each other.

In a common direct-type backlight, an electric field produced by a high voltage generated by the inverter serves as noise that is imparted to the liquid crystal display panel. This noise can be the to be an alternating current component leaking (via capacitance coupling) from the circuit including the inverters and the rod-shaped light sources to the liquid crystal display panel.

Figure 8:
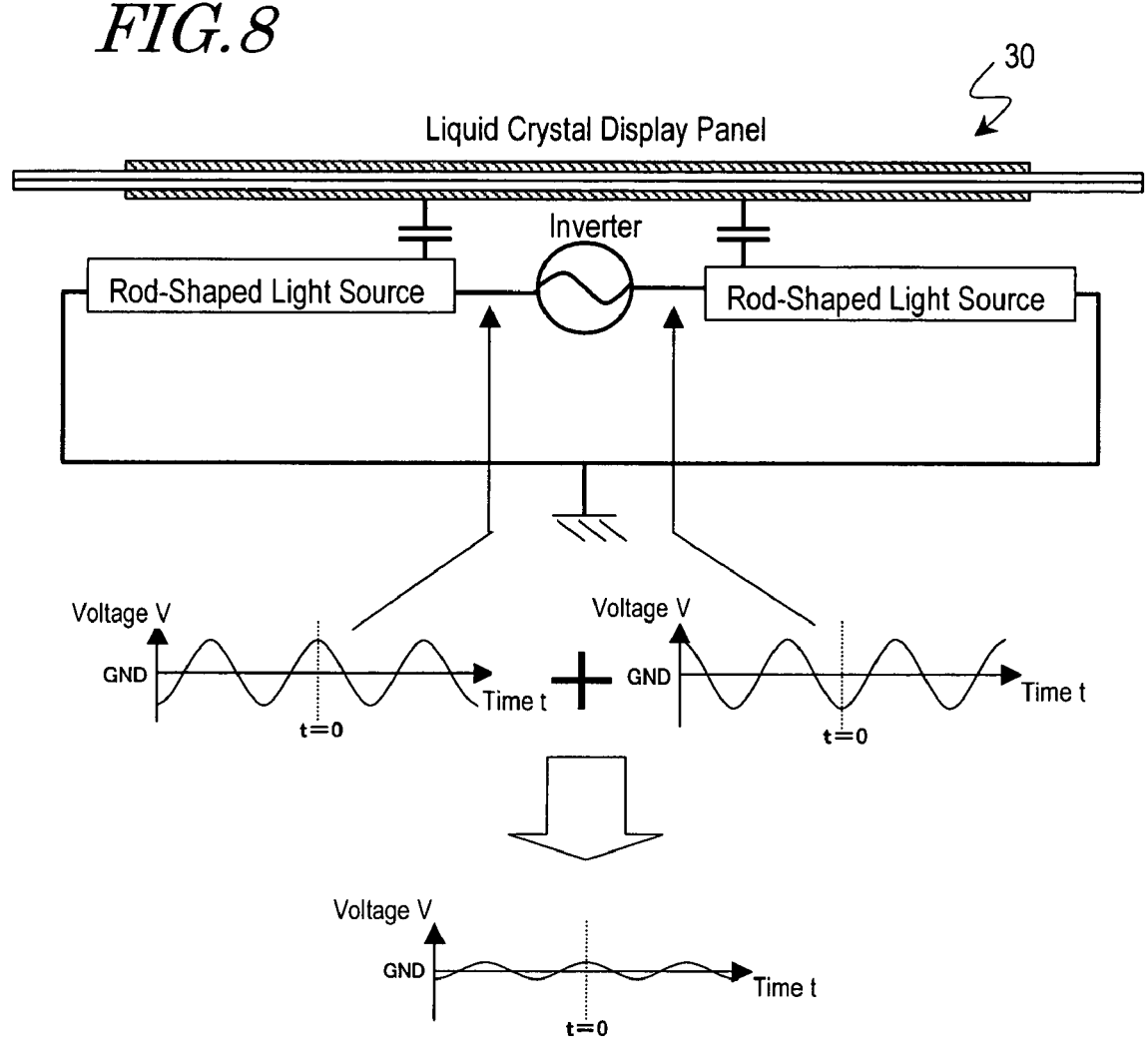
FIG. 8 schematically illustrates how noise is suppressed in the arrangement illustrated in FIG. 7A, FIG. 7B and FIG. 7C.

When two rod-shaped light sources 1 are electrically connected in series with each other, as illustrated in FIG. 7A, FIG. 7B and FIG. 7C, the two rod-shaped light sources 1 connected in series with each other receive voltages of the same period and opposite phases from the inverter 6', as illustrated in FIG. 8. The waveforms of these voltages combined together result in a waveform having a smaller amplitude (as a result of the waveforms canceling each other), indicating that the effective electric field which conventionally serves as noise is canceled, and the noise is suppressed.

Figure 9A:
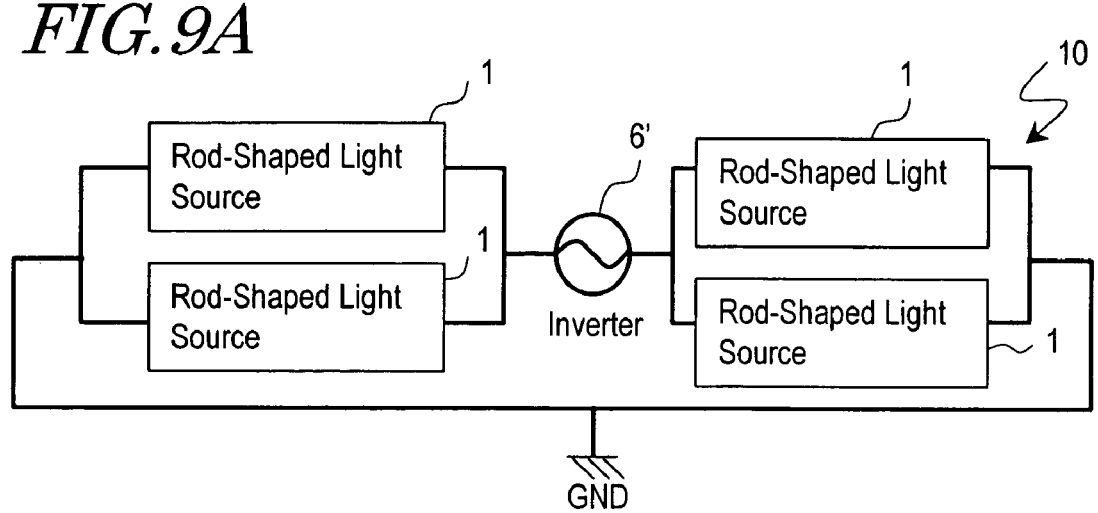
FIG. 9A, FIG. 9B and FIG. 9C schematically illustrate still another exemplary arrangement where each inverter is shared in the illuminator 10 according to a preferred embodiment of the present invention.

Although arrangements in which the rod-shaped light sources 1 are connected in parallel to each other are shown in FIG. 6A to FIG. 6C, and arrangements in which the rod-shaped light sources 1 are connected in series with each other are shown in FIG. 7A to FIG. 7C, it is also possible to combine a serial connection and a parallel connection. FIG. 9A illustrates still another exemplary arrangement where each inverter is shared. In the arrangement illustrated in FIG. 9A, four rod-shaped light sources 1 are electrically connected to one inverter 6', and each rod-shaped light source 1 is electrically connected in parallel to one or more of the other rod-shaped light sources 1 while being electrically connected in series with the remaining one or ones of the rod-shaped light sources 1.

Figure 9B:
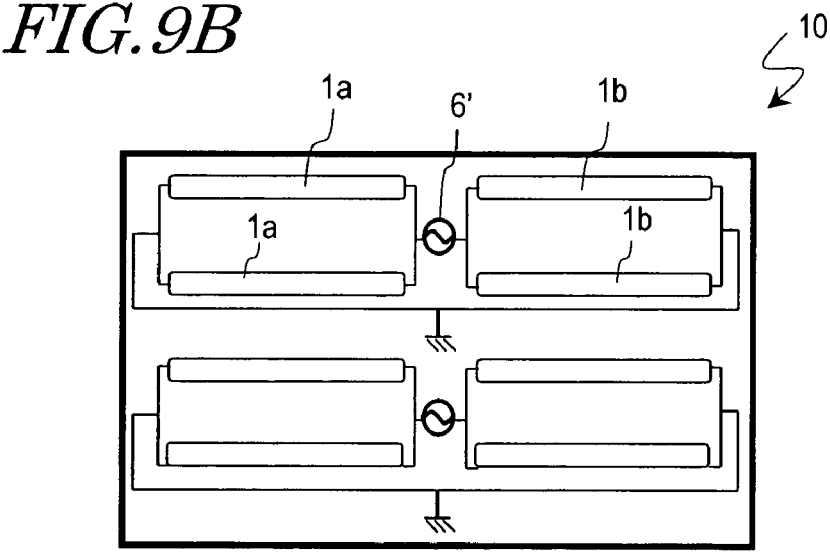
Figure 9C:
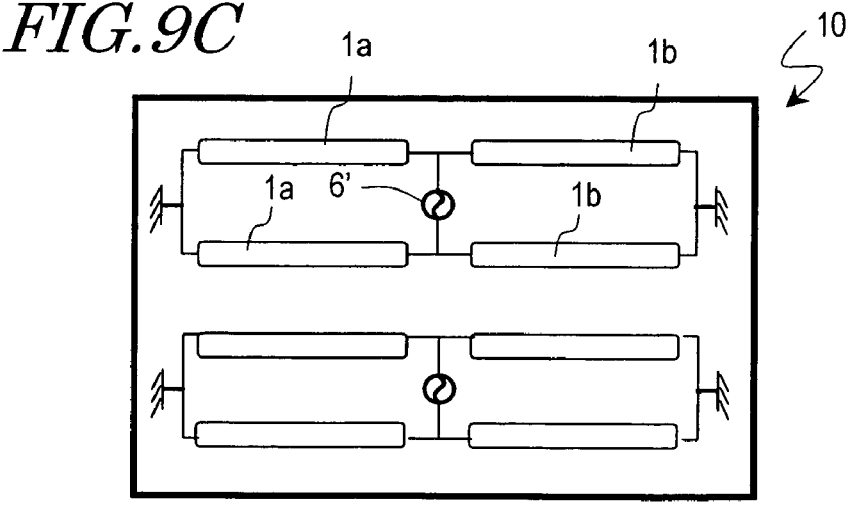
Figure 10A:
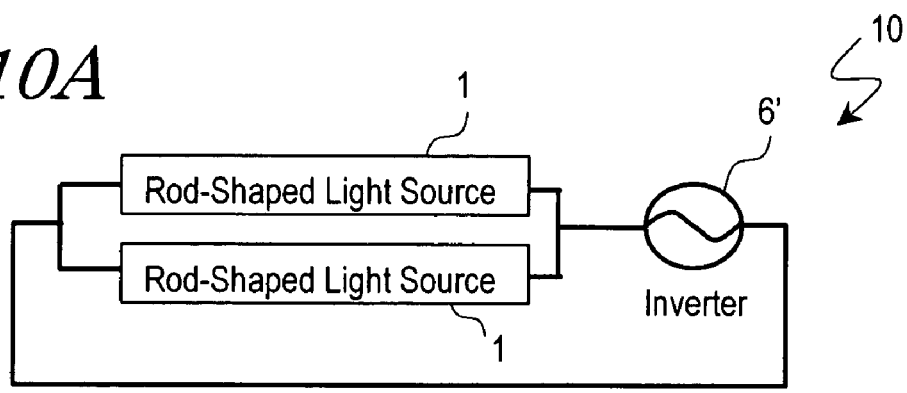
FIG. 10A, FIG. 10B and FIG. 10C schematically illustrate a preferred inverter arrangement in the illuminator 10 according to a preferred embodiment of the present invention.
Figure 10B:
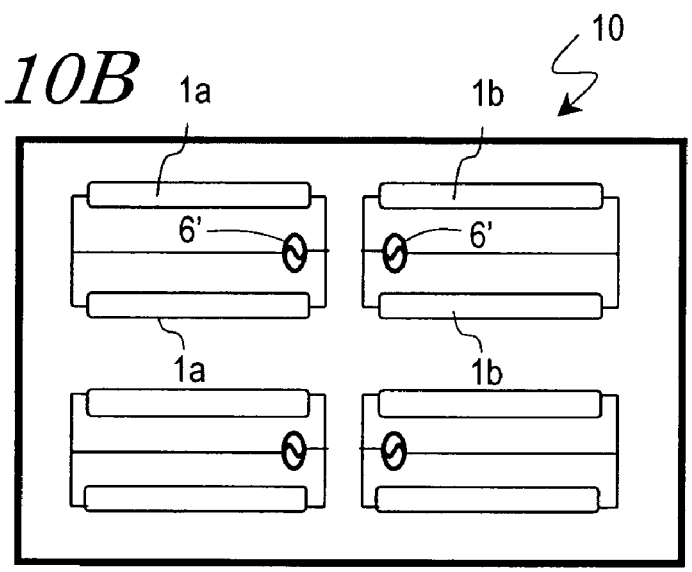
Figure 10C:
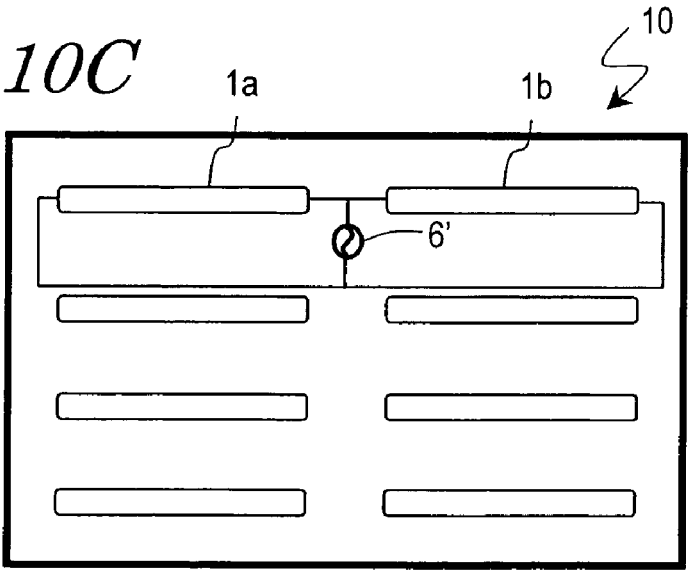
Figure 11A:
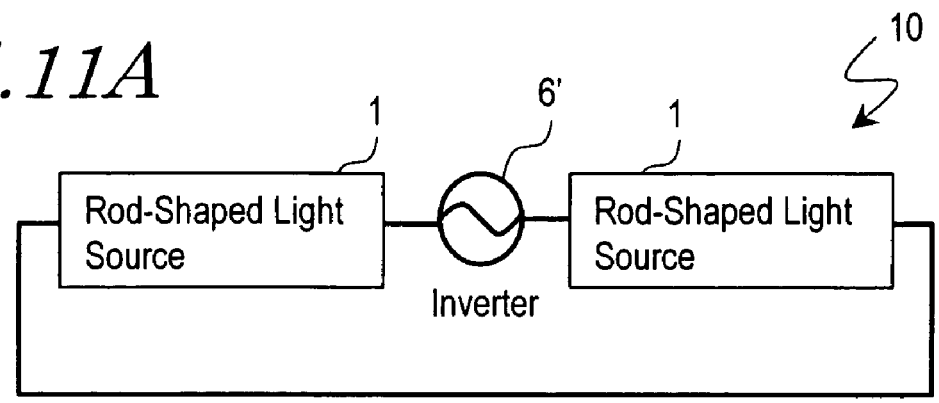
FIG. 11A, FIG. 11B and FIG. 11C schematically illustrate another preferred inverter arrangement in the illuminator 10 according to a preferred embodiment of the present invention.
Figure 11B:
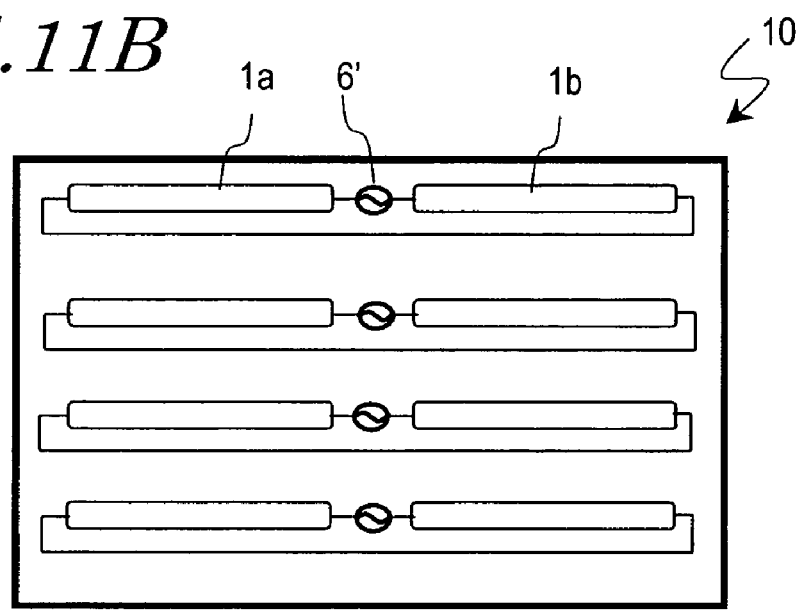
Figure 11C:
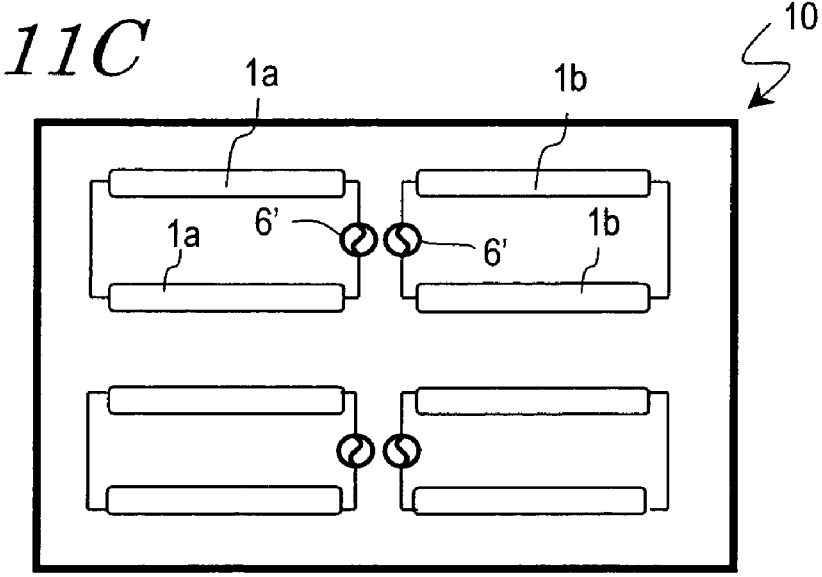
Figure 12A:
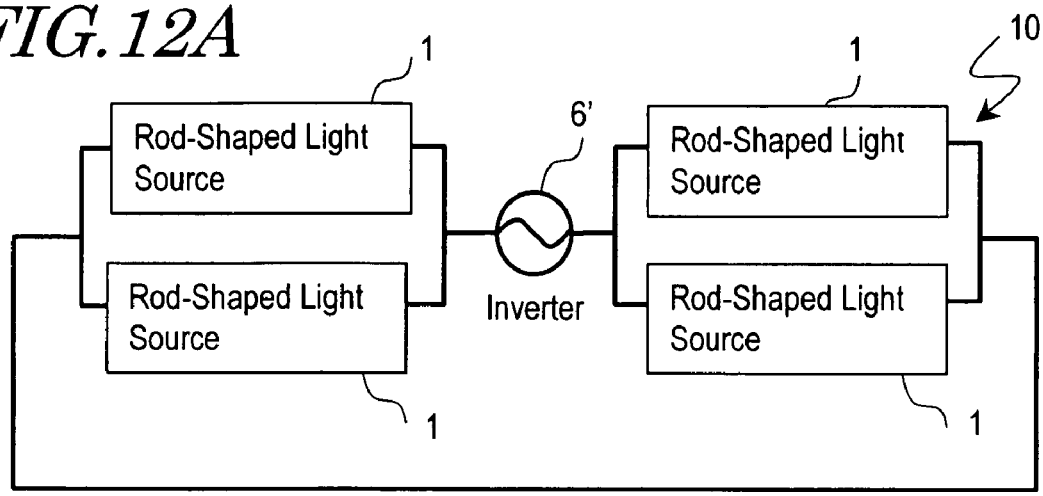
FIG. 12A, FIG. 12B and FIG. 12C schematically illustrate still another preferred inverter arrangement in the illuminator 10 according to a preferred embodiment of the present invention.
Figure 12B:
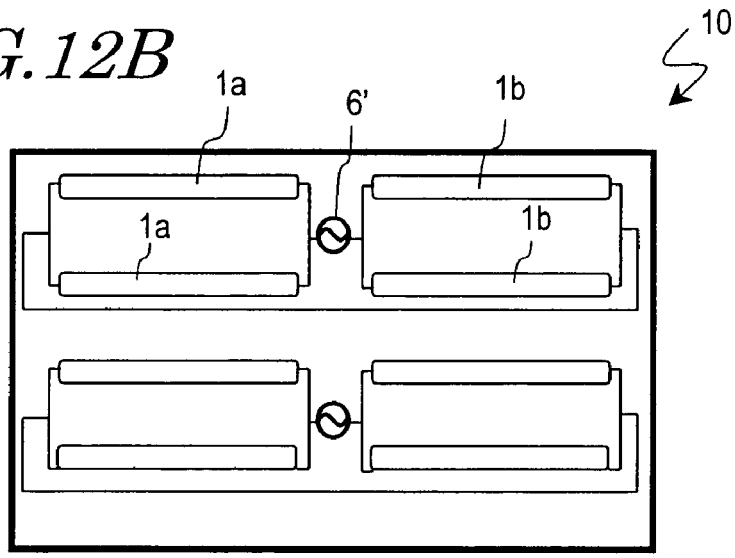
Figure 12C:
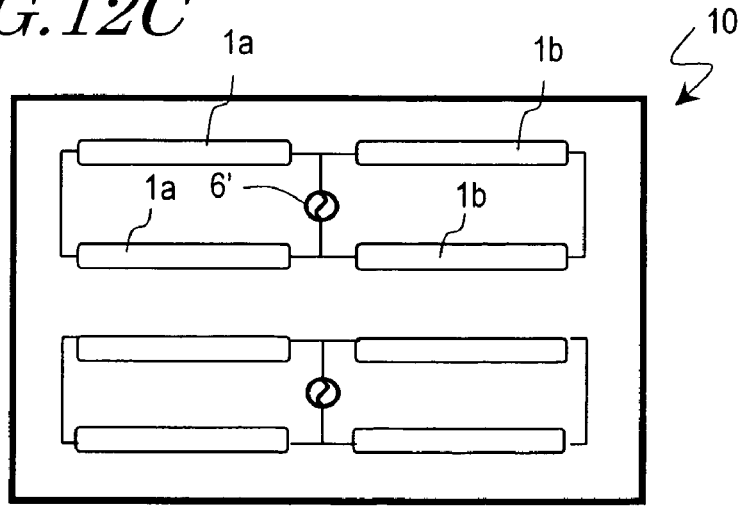

Exemplary arrangements of this type are shown in the form of wiring diagrams in FIG. 9B and FIG. 9C. In the arrangement illustrated in FIG. 9B, two vertically adjacent first light sources 1a and two vertically adjacent second light sources 1b are electrically connected to one inverter 6', and the pair of first light sources 1a are electrically connected in parallel to each other while the pair of second light sources 1b are also electrically connected in parallel to each other. The first light sources 1a and the second light sources 1b are electrically connected in series with each other.

In the arrangement illustrated in FIG. 9C, two vertically adjacent first light sources 1a and two vertically adjacent second light sources 1b are electrically connected to one inverter 6'. One of the two first light sources 1a is electrically connected in series with the other first light source 1a and one of the two second light sources 1b while being electrically connected in parallel to the other second light source 1b. Moreover, one of the two second light sources 1b is electrically connected in series with the other second light source 1b and one of the two first light sources 1a while being electrically connected in parallel to the other first light source 1a.

With arrangements where a serial connection and a parallel connection are combined together, as illustrated in FIG. 9A, FIG. 9B and FIG. 9C, it is possible to significantly reduce the cost by significantly reducing components such as transformers while benefiting from the advantages of a parallel connection and a serial connection. The rod-shaped light sources 1 electrically connected in parallel to each other receive voltages of the same period and the same phase from the inverter 6', thereby realizing a simple operation of the light sources without requiring a phase control. Moreover, the rod-shaped light sources 1 electrically connected in series with each other receive voltages of the same period and opposite phases from the inverter 6', thereby suppressing noise.

Note that while FIG. 6A to FIG. 6C, FIG. 7A to FIG. 7C and FIG. 9A to FIG. 9C each illustrate an arrangement where one end of each rod-shaped light source 1 that is not connected to the inverter 6' is grounded, the end of each rod-shaped light source 1 that is not connected to the inverter 6' may be not grounded but may be floating, as illustrated in FIG. 10A to FIG. 10C, FIG. 11A to FIG. 11C and FIG. 12A to FIG. 12C. With such arrangements, a component to which these members are grounded (e.g., a substrate) can be omitted, thus reducing the production cost.

Figure 13:
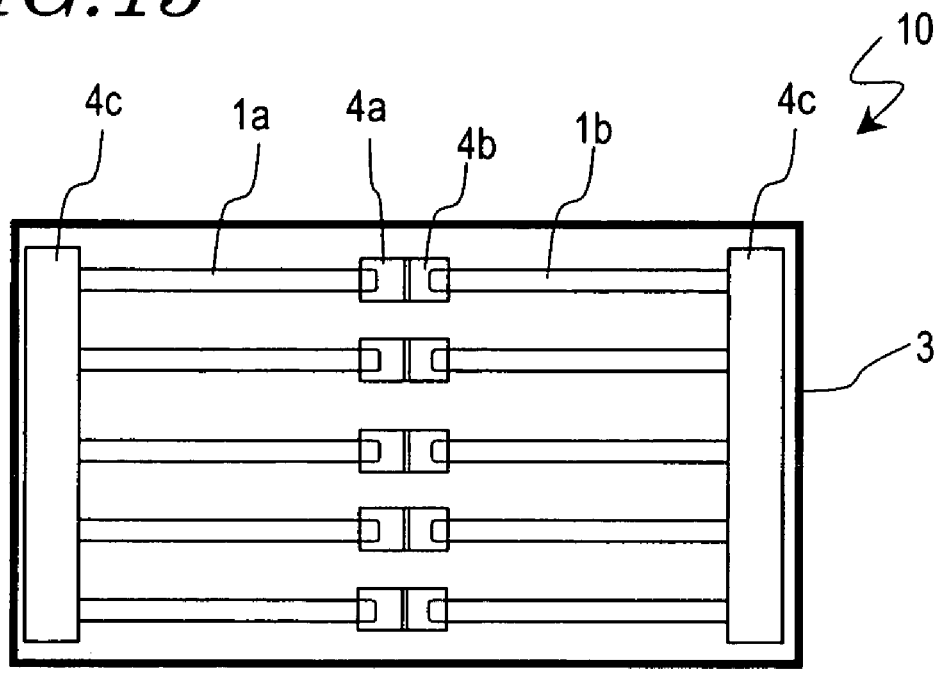
FIG. 13 is a plan view schematically illustrating the illuminator 10 according to a preferred embodiment of the present invention, together with supporting members for supporting rod-shaped light sources.

Although not shown in the figures referred to previously, the rod-shaped light sources 1 are preferably held in the case 3 by supporting members (holders) 4a, 4b and 4c, as illustrated in FIG. 13. If a light-transmitting material is used for each supporting member 4a for supporting one end of the first light source 1a that is closer to the second light source 1b and for each supporting member 4b for supporting one end of the second light source 1b that is closer to the first light source 1a, it is possible to increase the brightness in the area between the first light sources 1a and the second light sources 1b (i.e., the area where no light source exists), thereby realizing a more preferable light distribution. The light-transmitting material may be, for example, a semitransparent rubber, a transparent resin and a semi-transparent resin, or other suitable material. It should be noted that the holders 4a, 4b located in the central portion of the illuminator 10 could be made integral or combined to form one single unitary holder, as desired.

Figure 14:
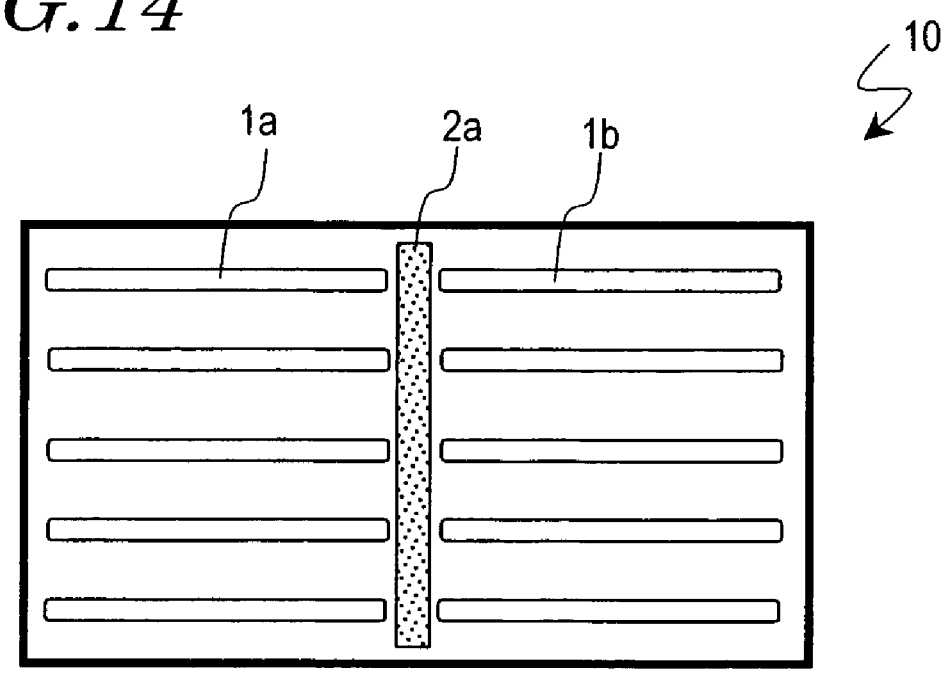
FIG. 14 is a plan view schematically illustrating the illuminator 10 including a light-scattering member provided between first rod-shaped light sources and second rod-shaped light sources.

Moreover, if a light-scattering member 2a for scattering light is provided between the first light sources 1a and the second light sources 1b, as illustrated in FIG. 14, portions of light output from the first light sources 1a and the second light sources 1b are scattered by the light-scattering member 2a. With such an arrangement, it is possible to increase the brightness in the area between the first light sources 1a and the second light sources 1b.

The light-scattering member 2a may be, for example, made of a material including a matrix of a resin material and particles dispersed in the matrix and having a different refractive index from that of the matrix. The resin material may be, for example, an acrylic resin, and the particles may be, for example, silica beads. Of course, instead of using such a light-scattering member of an internal scattering type, a light-scattering member having a light-scattering surface (e.g., a surface with minute irregularities) may be used, or the surface of a light-scattering member of an internal scattering type may be given a light-scattering property.

Figure 15A:
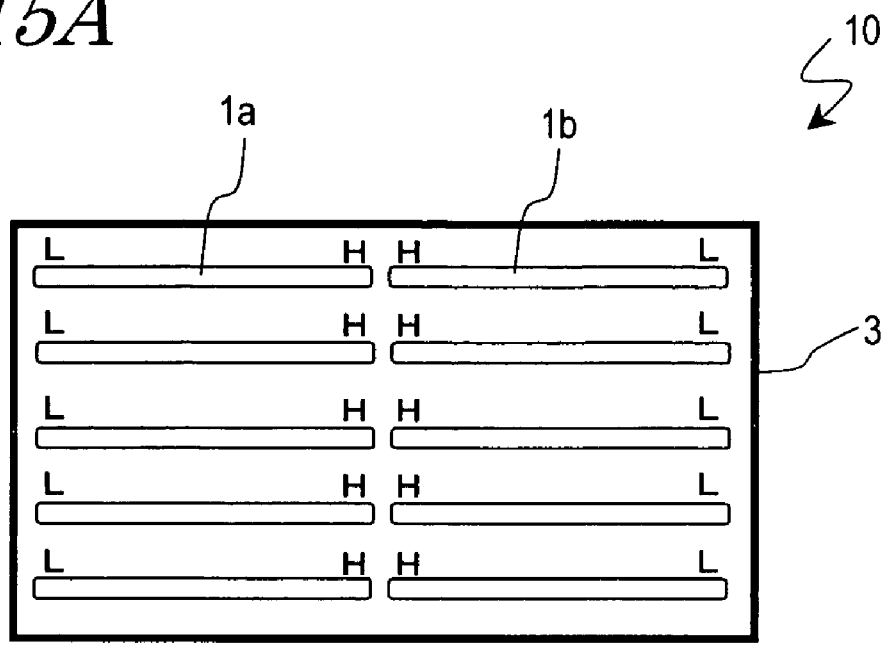
FIG. 15A and FIG. 15B schematically illustrate preferred arrangements for suppressing leakage occurring between first rod-shaped light sources and second rod-shaped light sources.
Figure 15B:
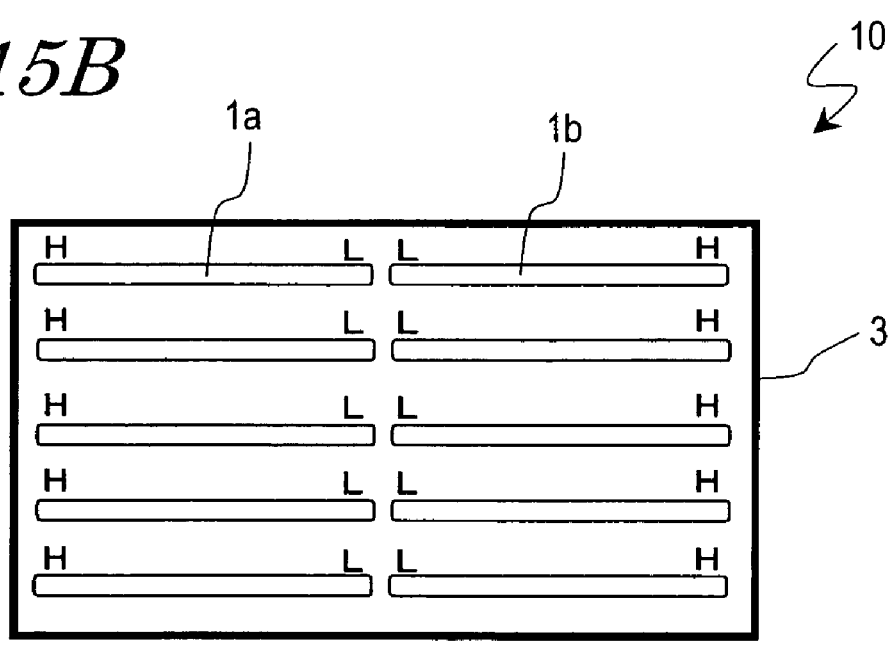

Although the interval between the first light sources 1a and the second light sources 1b (i.e., the width of the area where no light source exists) is preferably as small as possible in view of the uniformity and the brightness of the output light, the interval being excessively small may result in a leak current between the first light sources 1a and the second light sources 1b. By giving substantially the same potential to one end of the first light source 1a that is closer to the second light source 1b and to one end of the second light source 1b that is closer to the first light source 1a, it is possible to prevent the leakage and thus to reduce the interval between the first light sources 1a and the second light sources 1b. Specifically, a relatively high first potential may be applied to one end of the first light source 1a that is closer to the second light source 1b and to one end of the second light source 1b that is closer to the first light source 1a while giving a relatively low second potential (e.g., the ground potential) to the opposite end, as illustrated in FIG. 15A. Alternatively, a relatively low potential may be applied to one end of the first light source 1a that is closer to the second light source 1b and to one end of the second light source 1b that is closer to the first light source 1a while giving a relatively high potential to the opposite end, as illustrated in FIG. 15B.

While only the first rod-shaped light sources 1a and the second rod-shaped light sources 1b are provided as light sources in the present preferred embodiment, a plurality of third rod-shaped light sources may further be provided and arranged so as to be substantially parallel to each other and spaced from each other in the second direction, and arranged to be collinear with a corresponding one of the second rod-shaped light sources in the first direction.

Second Preferred Embodiment

Figure 16:
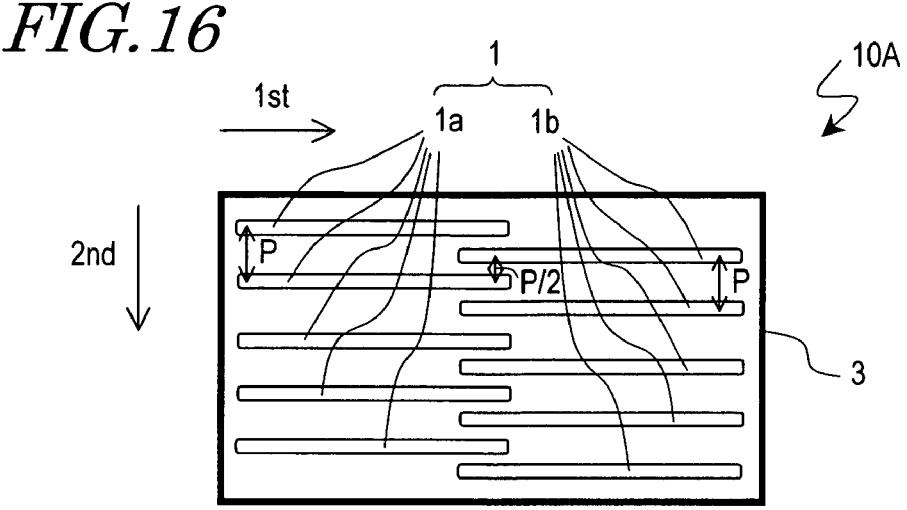
FIG. 16 is a plan view schematically illustrating another illuminator 10A according to a preferred embodiment of the present invention.

Referring to FIG. 16, an illuminator 10A of the present preferred embodiment will now be described. The illuminator 10A is also a backlight provided on the back side (the side away from the viewer) of a liquid crystal display panel. The following description will be directed primarily to what is different from the illuminator 10 of the first preferred embodiment.

In the illuminator 10 illustrated in FIG. 2, each second rod-shaped light source 1b is preferably arranged to extend along the same line along which the length of a corresponding one of the rod-shaped light sources 1a extends in the first direction, and thus is preferably collinear with the corresponding one of the rod-shaped light sources 1a of the first rod-shaped light sources in the first direction. Thus, the second rod-shaped light source 1b is preferably spaced from the first rod-shaped light source 1a in the first direction, but not in the second direction. In contrast, in the illuminator 10A of the present preferred embodiment, each second rod-shaped light source 1b is spaced from the corresponding first rod-shaped light source 1a in the second direction and arranged to be overlapped with the first rod-shaped light source 1a in the first direction, as illustrated in FIG. 16. Thus, the first light sources 1a arranged in a comb-tooth pattern and the second light sources 1b arranged in a comb-tooth pattern are spaced from each other such that none of the first light sources 1a is collinear with a corresponding one of the light sources 1b and vice versa, and such that end portions of the light sources 1a and 1b extending in the first direction overlap with each other by a certain amount along a line extending in the second direction and preferably only within a central region of the illuminator 10A, as described in more detail in the next paragraph.

More specifically, the first light sources 1a in the present preferred embodiment are arranged to be spaced from each other at a constant pitch P in the second direction, the second light sources 1b are arranged to be spaced from each other at a constant pitch P in the second direction, and the first light sources 1a and the second light sources 1b are spaced from each other preferably by about one half (P/2) of the pitch P in the second direction, for example. Furthermore, the overlapping amount in the first direction of the end portions of the first light sources 1a and the second light sources 1b is preferably smaller than the length of the first rod-shaped light source 1a. In other words, the first light sources 1a and the second light sources 1b are arranged so that their ends are overlapping at portions thereof extending along the first direction and facing each other in the second direction, with one end of each second light source 1b being sandwiched between ends of two vertically adjacent first light sources 1a, and with one end of each first light source 1a being sandwiched between ends of two vertically adjacent second light sources 1b.

In the illuminator 10A, the second light sources 1b are overlapped with the first light sources 1a by a certain amount along the first direction (longitudinal direction). Therefore, short rod-shaped light sources with a better handling property and a better anti-shock property than longer rod-shaped light sources can be used as the rod-shaped light sources 1. Moreover, since the rod-shaped light sources 1 all have the same length, the illuminator 10A has little electrical and optical characteristics variations among different positions across illuminator 10A, and it is possible to easily control the light emission.

Moreover, in the illuminator 10A of the present preferred embodiment, each second light source 1b is not collinear with the corresponding first light source 1a but is spaced from the first light source 1a in the second direction. Thus, it is possible to provide an arrangement whereby one end of the first light source 1a that is closer to the second light source 1b and one end of the second light source 1b that is closer to the first light source 1a are facing each other in the second direction and overlapping with each other by a certain amount along the first direction and preferably only in a central region of the illuminator 10A, as illustrated in FIG. 16. As a result, the rod-shaped light sources 1 completely cover a continuous, uninterrupted area extending along the first direction, thereby further increasing the uniformity and the brightness of the output light.

Figure 17:
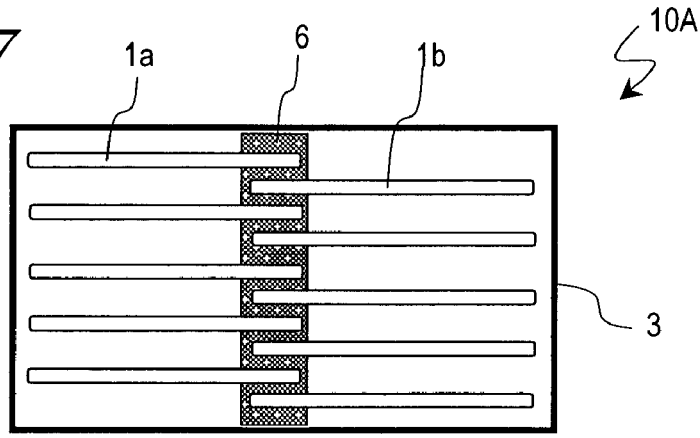
FIG. 17 schematically illustrates a preferred inverter arrangement in the illuminator 10A according to a preferred embodiment of the present invention.

Moreover, the inverters (and the inverter substrate 6) for operating the first light sources 1a and the second light sources 1b can be placed together between the first light sources 1a and the second light sources 1b, as illustrated in FIG. 17, whereby it is possible to realize a symmetric light distribution with the brightness being high near the center.

Furthermore, as described above in the first preferred embodiment with reference to FIG. 6A to FIG. 9C, it is possible to use an arrangement where each inverter is shared, thus realizing similar effects such as reducing the cost, simplifying the operation, and suppressing noise.

Moreover, if substantially the same potential is applied to one end of the first light source 1a that is closer to the second light source 1b and to one end of the second light source 1b that is closer to the first light source 1a, it is possible to prevent leakage occurring between the first light source 1a and the second light source 1b.

Figure 18:
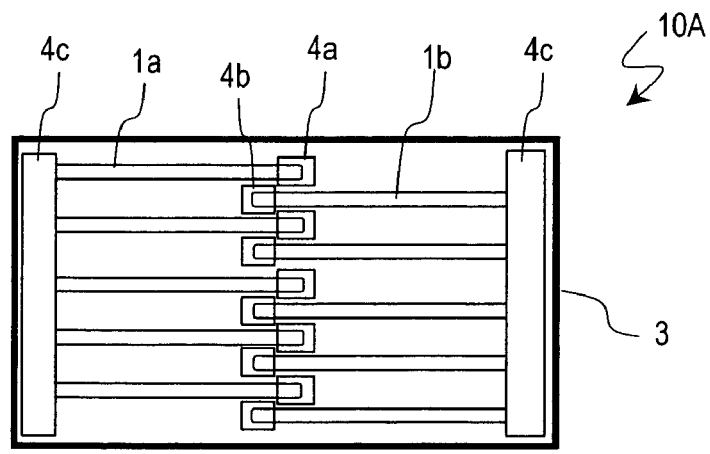
FIG. 18 is a plan view schematically illustrating the illuminator 10A according to a preferred embodiment of the present invention, together with supporting members for supporting rod-shaped light sources.

Note that the first light sources 1a and the second light sources 1b are in practice held in the case 3 preferably by the supporting members (holders) 4a, 4b and 4c, as illustrated in FIG. 18. If the supporting member 4a for supporting one end of the first light source 1a that is closer to the second light source 1b and the supporting member 4b for supporting one end of the second light source 1b that is closer to the first light source 1a are made of a light-transmitting material, it is possible to further improve the brightness near one end of the first light source 1a that is closer to the second light source 1b and near one end of the second light source 1b that is closer to the first light source 1a.

Figure 19:
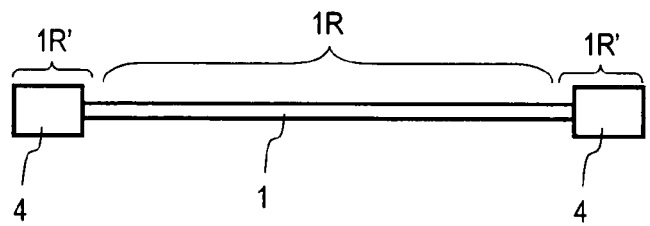
FIG. 19 schematically illustrates a rod-shaped light source including a light-emitting region and non-light-emitting regions.
Figure 20:
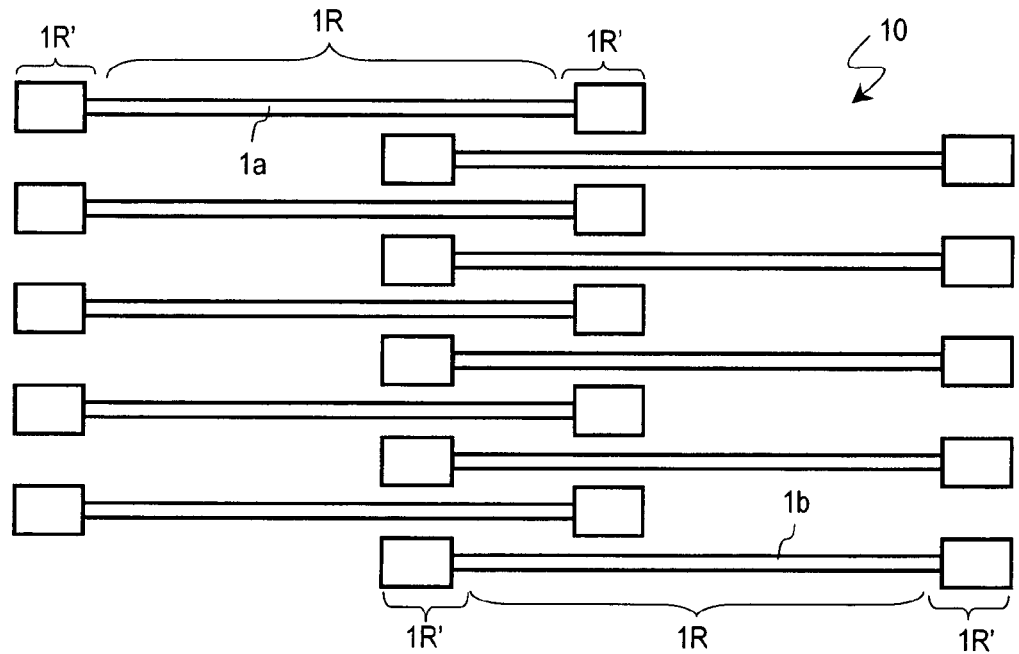
FIG. 20 schematically illustrates a preferred arrangement of rod-shaped light sources each including a light-emitting region and non-light-emitting regions.

The rod-shaped light source 1 typically includes a light-emitting region 1R where light is emitted and two non-light-emitting regions 1R' where light is not substantially emitted, the non-light-emitting regions 1R' being adjacent respectively to opposite ends of the light-emitting region 1R, as illustrated in FIG. 19. Specifically, the non-light-emitting regions 1R' are regions where supporting members (e.g., rubber holders) 4 and electrodes are provided. With an arrangement where the non-light-emitting regions 1R' of the first light sources 1a on one side that is closer to the second light sources 1b are not facing and not overlapping with the non-light-emitting regions 1R' of the second light sources 1b on one side that is closer to the first light sources 1a, as illustrated in FIG. 20, it is possible to prevent the brightness in the central area from being decreased.

Figure 21:
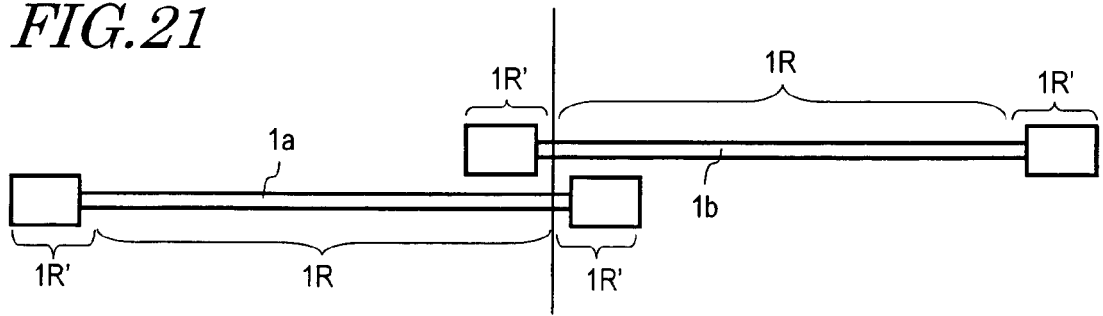
FIG. 21 schematically illustrates another preferred arrangement of rod-shaped light sources each including a light-emitting region and non-light-emitting regions.

In order to keep the rod-shaped light sources 1 as short as possible while keeping a high brightness in the central area, it is preferred that the boundary between the light-emitting regions 1R of the first light sources 1a and the non-light-emitting regions 1R' thereof on one side that is closer to the second light sources 1b is spaced from and overlapped with, in the first direction, the boundary between the light-emitting regions 1R of the second light sources 1b and the non-light-emitting regions 1R' thereof on one side that is closer to the first light source 1a, as illustrated in FIG. 21. In other words, end portions of the light-emitting regions 1R of the first light sources 1a and end portions of the light-emitting regions 1R of the second light sources 1b located in the central region of the illuminator 10A are overlapped with each other along a line (shown in FIG. 21) that extends in the second direction.

Figure 22:
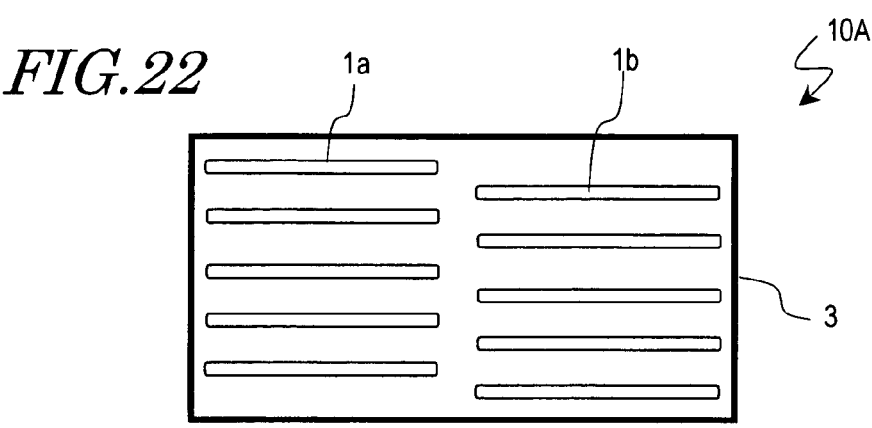
FIG. 22 is a plan view schematically illustrating the illuminator 10A according to a preferred embodiment of the present invention.
Figure 23:
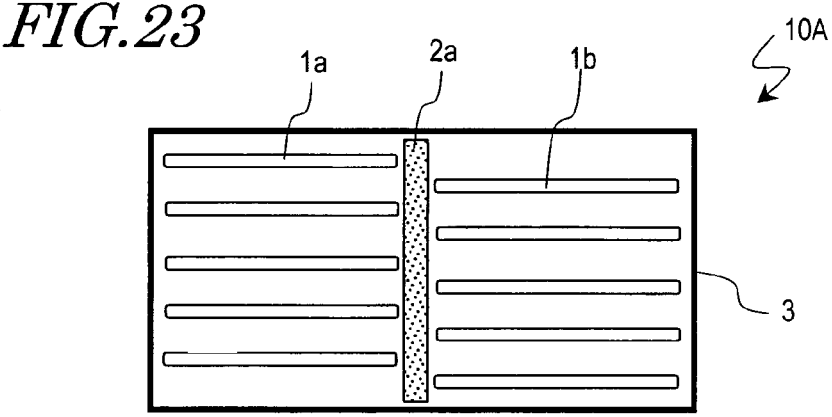
FIG. 23 is a plan view schematically illustrating the illuminator 10A including a light-scattering member between first rod-shaped light sources and second rod-shaped light sources.

In the present preferred embodiment as described above, the light sources are arranged so that the amount by which the first light sources 1a and the second light sources 1b are overlapped with each other in the first direction is preferably shorter than the length of the first rod-shaped light source 1a, with an end of the first light source 1a facing an end of the second light source 1b in the second direction. Alternatively, the light sources may be arranged so that the first light sources 1a and the second light sources 1b are spaced from each other in the first direction by a distance that is preferably less than, or can be equal to or greater than, the length of the first rod-shaped light source 1a, with an end of the first light source 1a not overlapping with and facing an end of the second light source 1b, as illustrated in FIG. 22. With such an alternative arrangement, the light-scattering member 2a for scattering light may be provided between the first light sources 1a and the second light sources 1b, as illustrated in FIG. 23, in order to increase the brightness in the area between the first light sources 1a and the second light sources 1b.

Third Preferred Embodiment

Before describing the illuminator of the present preferred embodiment, the brightness non-uniformity problem with direct-type backlights will be discussed below.

Figure 37:
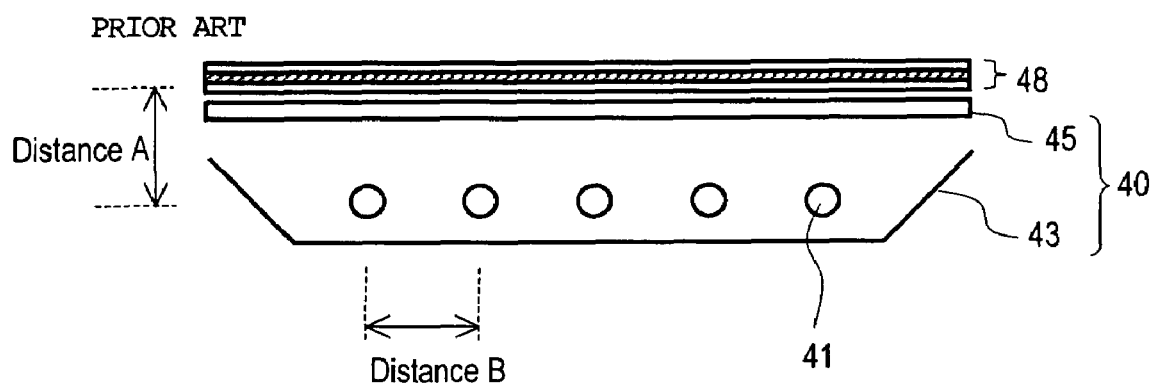
FIG. 37 is a cross-sectional view schematically illustrating the conventional common direct-type backlight 40.
Figure 38:
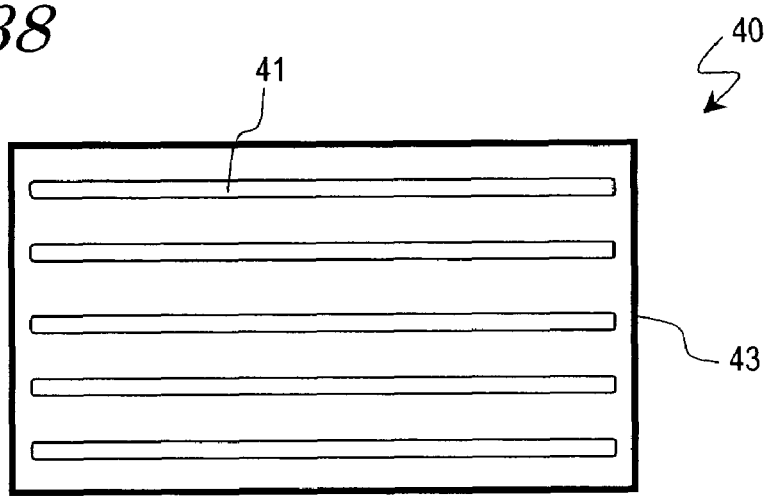
FIG. 38 is a plan view schematically illustrating the conventional common direct-type backlight 40.
Figure 39:
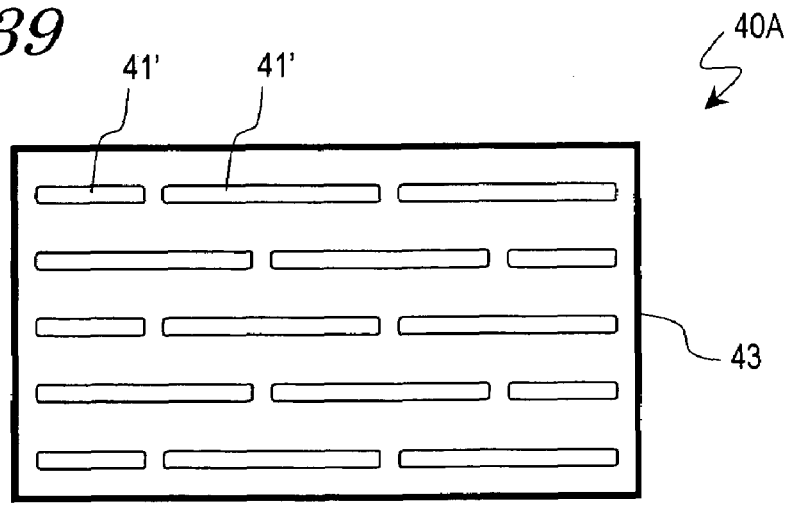
FIG. 39 is a plan view schematically illustrating a conventional direct-type backlight 40A.

With the direct-type backlight 40 illustrated in FIG. 37 and FIG. 38, the light sources (fluorescent tubes) 41 are arranged so that the extent in the direction perpendicular to the longitudinal direction of the light sources 41 is covered by the light sources 41 only in an interrupted (discrete)

manner, thereby resulting in a brightness non-uniformity with the brightness being higher in areas directly above the light sources 41 and lower in other areas between the light sources 41.

The brightness non-uniformity is smaller as the distance A between the light sources 41 and the liquid crystal display panel 48 is larger and as the distance B between the light sources 41 is smaller. Therefore, the smaller the ratio R (=B/A) of the distance B with respect to the distance A is, the smaller the brightness non-uniformity is, and vice versa. Thus, it is possible to reduce the brightness non-uniformity by increasing the distance A between the light sources 41 and the liquid crystal display panel 48 or by increasing the number of the light sources 41 to shorten the distance B between the light sources 41.

However, an increase in the distance A between the light sources 41 and the liquid crystal display panel 48 leads to an increase in the thickness of the backlight 40, and thus the display device, thereby detracting from its commercial value. Moreover, an increase in the number of the light sources 41 to reduce the distance B between the light sources 41 leads to an increase in the cost, thereby also detracting from its commercial value.

Figure 24:
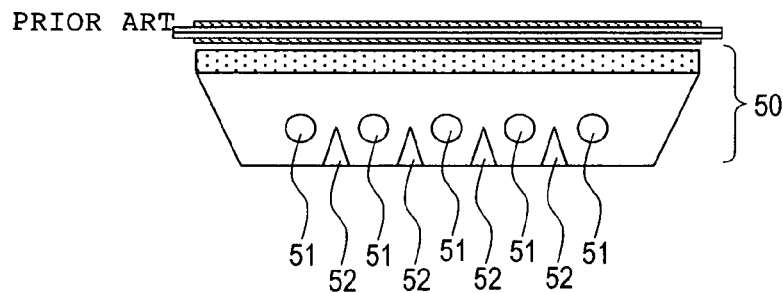
FIG. 24 is a cross-sectional view schematically illustrating a conventional backlight 50 including light-reflecting protruding portions between light sources.

In view of this, Japanese Laid-Open Patent Publication No. 2002-122863 discloses a backlight 50 in which the light-reflecting protruding portions 52 having a triangular cross section are provided between light sources 51, as illustrated in FIG. 24, thereby suppressing the brightness non-uniformity.

Figure 25:
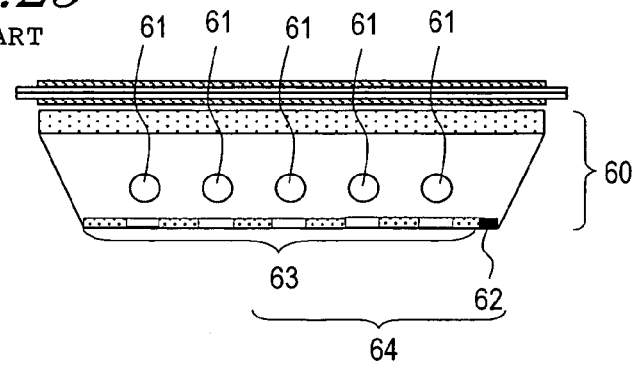
FIG. 25 is a cross-sectional view schematically illustrating a conventional backlight 60 with an auxiliary light source including a primary light source and a lightguide plate.

Moreover, Japanese Laid-Open Patent Publication No. 2000-310776 discloses a backlight 60 in which an auxiliary light source 64 including a primary light source 62 and a lightguide plate 63 is provided on one side of the light sources 61 that is spaced away from the liquid crystal display panel, as illustrated in FIG. 25, thereby suppressing the brightness non-uniformity. Moreover, Japanese Laid-Open Patent Publication No. 2000-310776 discloses an arrangement in which the light-scattering dot patterns on the surface of the lightguide plate 63 for taking out light that has entered the lightguide plate 63 from the primary light source 62 are arranged sparsely in areas directly under the light sources 61 and densely in other areas between the light sources 61, whereby the brightness of light from the lightguide plate 63 can be decreased in areas directly under the light sources 61 and increased in other areas between the light sources 61, thus further suppressing the brightness non-uniformity.

In-depth research conducted by the present inventor from various viewpoints regarding the relationship between the structure of a backlight and the degree of brightness non-uniformity revealed that the brightness non-uniformity is not sufficiently suppressed with the backlights disclosed in these publications. Specifically, with any of the backlights disclosed in these publications, although the brightness non-uniformity is sufficiently small in the normal direction (the direction normal to the display plane of the display device), it is not sufficiently small in an inclined direction (a direction inclined with respect to the display plane normal direction).

Figure 26:
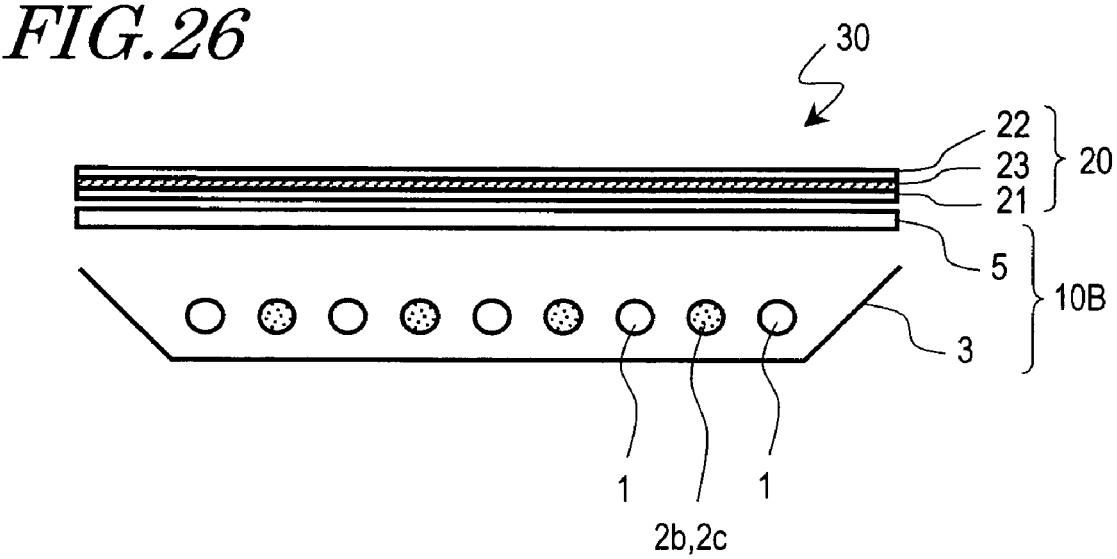
FIG. 26 is a cross-sectional view schematically illustrating the liquid crystal display device 30 including still another illuminator 10B according to a preferred embodiment of the present invention.
Figure 27:
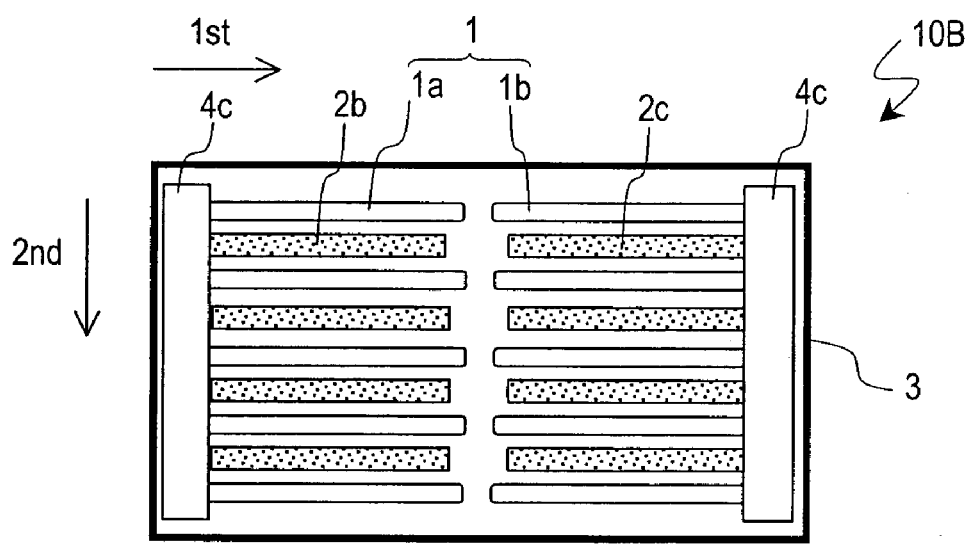
FIG. 27 is a plan view schematically illustrating the illuminator 10B according to a preferred embodiment of the present invention.

Now, an illuminator 10B of the present preferred embodiment will be described with reference to FIG. 26 and FIG. 27. FIG. 26 is a cross-sectional view schematically illustrating the liquid crystal display device 30 including the illuminator 10B, and FIG. 27 is a plan view schematically illustrating the illuminator 10B.

The illuminator 10B differs from the illuminator 10 illustrated in FIG. 1 and FIG. 2 in that the illuminator 10B includes light-scattering members 2b each preferably provided between two vertically adjacent first rod-shaped light sources 1a and light-scattering members 2c each provided between two vertically adjacent second rod-shaped light sources 1b.

In the present preferred embodiment, each light-scattering member 2b is preferably a rod-shaped member, and disposed generally in the middle between two vertically adjacent first light sources 1a and generally parallel to the first light sources 1a. Moreover, each light-scattering member 2c is a rod-shaped member, and disposed generally in the middle between two vertically adjacent second light sources 1b and generally parallel to the second light sources 1b. The light-scattering members 2b and 2c are typically held in the case 3 by the supporting members 4c, as are the first light sources 1a and the second light sources 1b.

In the illuminator 10B of the present preferred embodiment, the light-scattering members 2b and 2c are each arranged between two rod-shaped light sources 1 that are adjacent to each other in the second direction, whereby portions of light output from the rod-shaped light sources 1 are scattered by the light-scattering members 2b and 2c, thus increasing the intensity of light coming out from areas of the illuminator 10B between the rod-shaped light sources 1 (i.e., areas between vertically adjacent first rod-shaped light sources 1a and areas between adjacent second rod-shaped light source 1b). Thus, it is possible to reduce the brightness non-uniformity. Since the light-scattering members 2b and 2c provided between the rod-shaped light sources 1 scatter light substantially in every azimuth direction, the light-scattering members 2b and 2c not only function to increase the intensity of light coming out from areas between the rod-shaped light sources 1 but also function as pseudo light sources. Therefore, it is possible to realize an optical system similar to those realized with a larger number of rod-shaped light sources 1 arranged at shorter intervals. Thus, the brightness non-uniformity can be reduced not only in the normal direction (the direction normal to the display plane of the display device) but also in an inclined direction (a direction inclined with respect to the display plane normal direction).

FIG. 28 to FIG. 31 illustrate how a brightness non-uniformity occurs in a conventional direct-type backlight, and how a brightness non-uniformity is suppressed in the illuminator 10 of preferred embodiments of the present invention. Note that fewer rod-shaped light sources are shown in FIG. 28 to FIG. 31 than in FIG. 24 to FIG. 27, FIG. 37 and FIG. 38 for the sake of simplicity.

Figure 28:
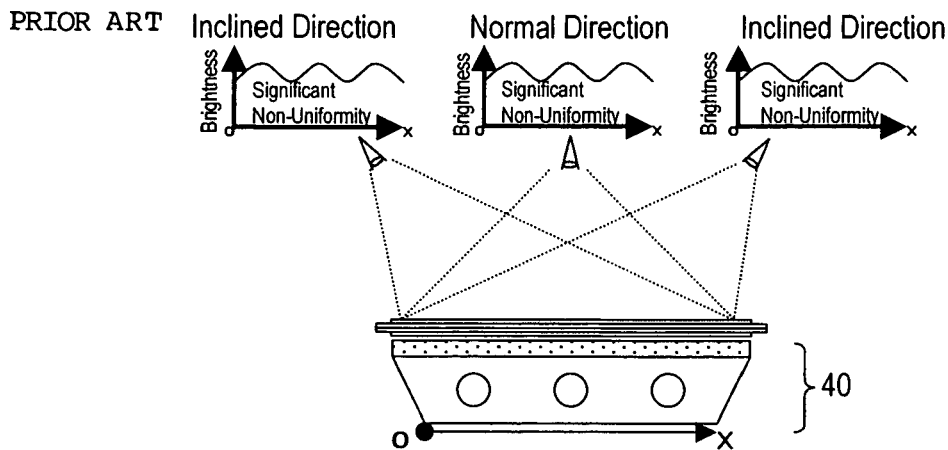
FIG. 28 schematically illustrates how a brightness non-uniformity occurs in the conventional direct-type backlight 40.

The typical conventional direct-type backlight 40 has a significant brightness non-uniformity both in the normal direction and in inclined directions, as illustrated in FIG. 28. Thus, the display quality is lowered.

Figure 29:
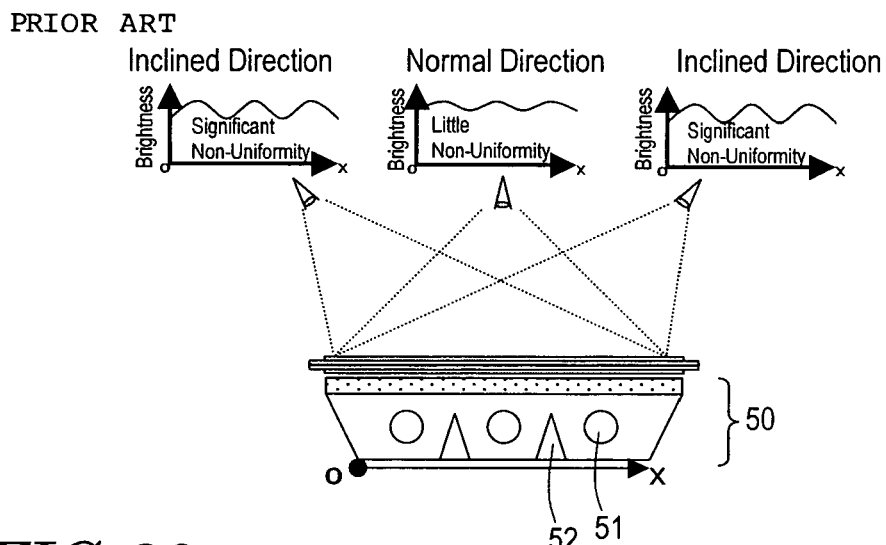
FIG. 29 schematically illustrates how a brightness non-uniformity occurs in the conventional direct-type backlight 50.

The backlight 50 disclosed in Japanese Laid-Open Patent Publication No. 2002-122863 includes the light-reflecting protruding portions 52 between the light sources 51, as illustrated in FIG. 29, thereby increasing the intensity of light coming out from areas between the light sources 51 and thus reducing the brightness non-uniformity in the normal direction. However, unlike the light-scattering members 2b and 2c capable of scattering light in every azimuth direction, the protruding portions 52, which have a triangular cross section and is light-reflecting, do not function as pseudo light sources, whereby it is not possible to sufficiently reduce the brightness non-uniformity in inclined directions. Thus, the display quality is not improved sufficiently.

Figure 30:
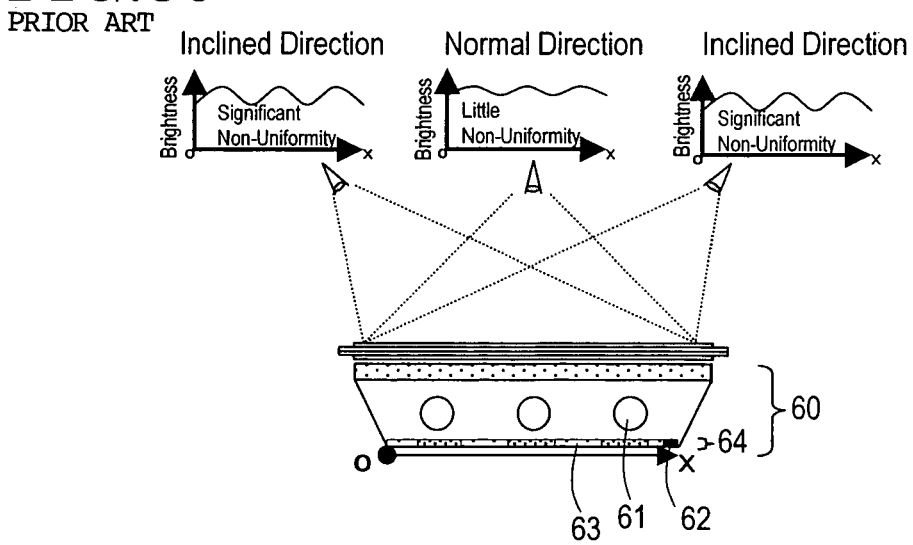
FIG. 30 schematically illustrates how a brightness non-uniformity occurs in the conventional direct-type backlight 60.

In the backlight 60 disclosed in Japanese Laid-Open Patent Publication No. 2000-310776, the auxiliary light source 64 is provided under the light source 61, as illustrated in FIG. 30, and the light-scattering dot patterns on the lightguide plate 63 of the auxiliary light source 64 are arranged sparsely in areas directly under the light sources 61 and densely in other areas between the light sources 61, thereby increasing the intensity of light coming out from areas between the light sources 61 and thus reducing the brightness non-uniformity in the normal direction. However, the auxiliary light source 64, which is placed under, but not between, the light sources 61 and which provides a planar light emission, cannot function as a pseudo light source in cooperation with the rod-shaped light sources 61. Therefore, it is not possible to sufficiently reduce the brightness non-uniformity in inclined directions. Thus, the display quality is not improved sufficiently.

Figure 31:
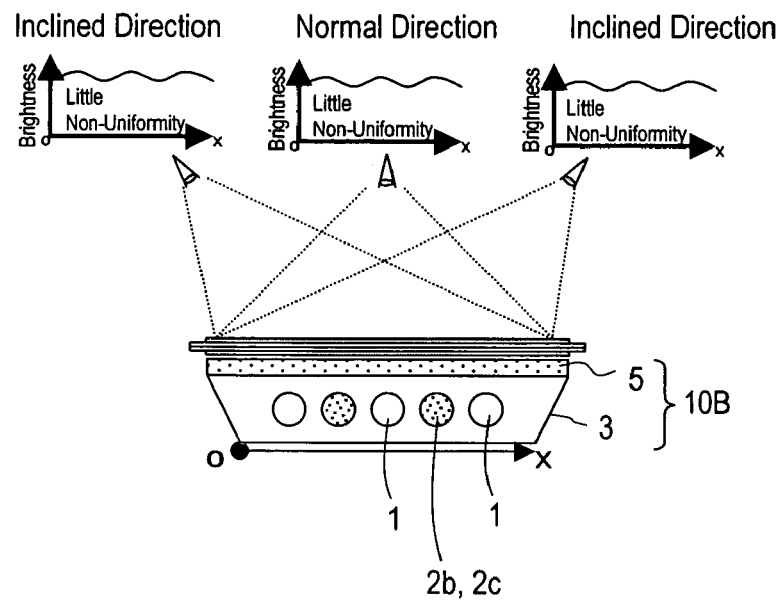
FIG. 31 schematically illustrates how a brightness non-uniformity is suppressed in the illuminator 10B according to a preferred embodiment of the present invention.

In contrast, in the illuminator 10B of the present preferred embodiment, the light-scattering members 2b and 2c are provided each between two rod-shaped light sources 1 adjacent to each other in the second direction, as illustrated in FIG. 31, and thus the light-scattering members 2b and 2c can function as pseudo light sources, whereby it is possible to reduce the brightness non-uniformity not only in the normal direction but also in inclined directions. Thus, a display device using the illuminator 10B can produce a high-quality display. Moreover, since the light-scattering members 2b and 2c function as pseudo light sources, it is possible to reduce the distance between the liquid crystal display panel and the rod-shaped light sources 1 (corresponding to the distance A in FIG. 37) without increasing the number of rod-shaped light sources 1. Therefore, the illuminator 10B has a high commercial value as it can be made in a thinner profile, and it can also be manufactured at a low cost.

Figure 32A:
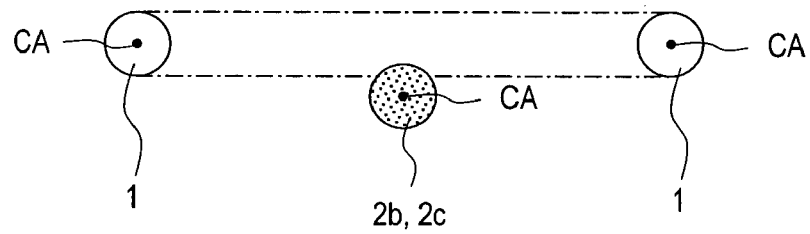
FIG. 32A, FIG. 32B and FIG. 32C each illustrate an arrangement of light-scattering members used in the illuminator 10B.
Figure 32B:
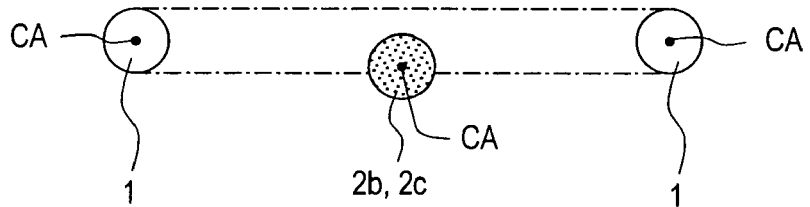
Figure 32C:
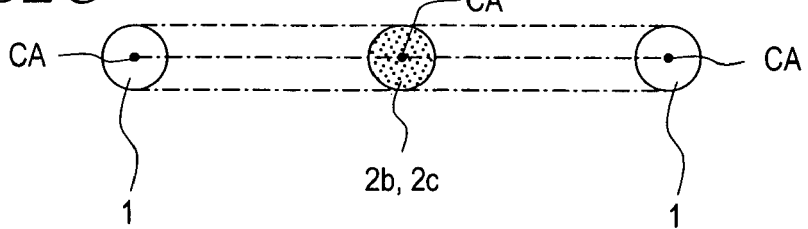

As described above, in the illuminator 10B, the light-scattering members 2b and 2c for scattering light can function as pseudo light sources because they are arranged while considering not only their planar positioning with the rod-shaped light sources 1 but also their three-dimensional positioning with the rod-shaped light sources 1. The light-scattering members 2b and 2c are located "between" the rod-shaped light sources 1 not only as viewed in the display plane normal direction, as illustrated in FIG. 27, but are also located "between" the rod-shaped light sources 1 as viewed in the longitudinal direction of the rod-shaped light sources 1, as illustrated in FIG. 26. Note that "the light-scattering members 2b and 2c being positioned between the rod-shaped light sources 1 as viewed in the longitudinal direction of the rod-shaped light sources 1" as used herein means that the light-scattering members 2b and 2c are at least partially included within the space defined between two rod-shaped light sources 1, as illustrated in FIG. 32A to FIG. 32C. In order to further reduce the brightness non-uniformity as viewed in inclined directions, it is preferred that the central axis (virtual axis) CA of each of the light-scattering members 2b and 2c is included within the space defined between the rod-shaped light sources 1, as illustrated in FIG. 32B, and it is more preferred that the central axis CA of each of the light-scattering members 2b and 2c is substantially coplanar (at the same height as) the central axes CA of the rod-shaped light sources 1, as illustrated in FIG. 32C.

Moreover, in order for the light-scattering members 2b and 2c to function desirably as pseudo light sources, it is preferred that the light-scattering members 2b and 2c have light distribution characteristics close to those of the rod-shaped light sources 1. In order for the light-scattering members 2b and 2c to have light distribution characteristics close to those of the rod-shaped light sources 1, it is preferred that the light-scattering members 2b and 2c are rod-shaped members and that the rod-shaped light-scattering members 2b and 2c are arranged generally parallel to the rod-shaped light sources 1, as in the present preferred embodiment. Moreover, it is preferred that the rod-shaped light-scattering members 2b and 2c each have substantially the same outer diameter as that of the rod-shaped light source 1.

Figure 33A:
FIG. 33A to FIG. 33E each illustrate the shape of the cross section of the light-scattering member used in the illuminator 10B taken in a direction perpendicular to the longitudinal direction.
Figure 33B:
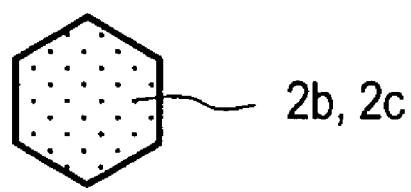
Figure 33C:
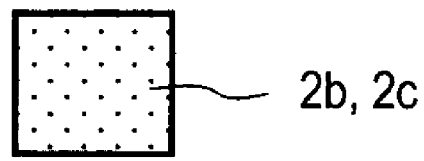
Figure 33D:
Figure 33E:
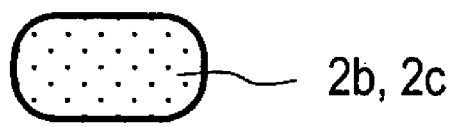

While the present preferred embodiment preferably includes the cylindrical light-scattering members 2b and 2c having a generally circular cross section in a direction perpendicular to the longitudinal direction, the shape of the cross section of the light-scattering members 2b and 2c is not limited to this. Alternatively, the shape of the cross section of the light-scattering members 2b and 2c perpendicular to the longitudinal direction may be a generally circular shape as illustrated in FIG. 33A, a generally regular polygonal shape as illustrated in FIG. 33B, or a generally rectangular shape as illustrated in FIG. 33C. It may also be a generally elliptical shape as illustrated in FIG. 33D, or a generally rectangular shape with circular arc corners as illustrated in FIG. 33E. Note however that in order to realize light distribution characteristics close to those of the rod-shaped light sources 1, it is preferred that the shape of the cross section of the light-scattering members 2b and 2c taken in a direction that is perpendicular to the longitudinal direction is generally the same as that of the rod-shaped light sources 1. Since a typical rod-shaped light source such as a cold cathode fluorescent tube often has a generally circular cross section, it is preferred from that point of view that the shape of the cross section of the light-scattering members 2b and 2c taken in the direction that is perpendicular to the longitudinal direction is generally circular.

Note that while only one of each of the light-scattering members 2b and 2c is provided between two adjacent rod-shaped light sources 1 in the present preferred embodiment, more than one of each of the light-scattering members 2b and 2c may be provided between two adjacent rod-shaped light sources 1. Where one of each of the light-scattering members 2b and 2c is provided between two adjacent rod-shaped light sources 1, as in the present preferred embodiment, it is preferred that the light-scattering member 2b or 2c is located generally in the middle between the two rod-shaped light sources 1. If the light-scattering member 2b or 2c is located generally in the middle between two adjacent rod-shaped light sources 1, it is possible to increase the effect of suppressing the brightness non-uniformity.

Each of the light-scattering members 2b and 2c may be, for example, made of a material including a matrix of a resin material and particles dispersed in the matrix and having a different refractive index from that of the matrix. The resin material may be, for example, an acrylic resin, and the particles may be, for example, silica beads. Of course, instead of using such a light-scattering member of an internal scattering type, a light-scattering member having a light-scattering surface (e.g., a surface with minute irregularities) may be used, or the surface of a light-scattering member of an internal scattering type may have a light-scattering property.

The degree to which the light-scattering members 2b and 2c scatter light is defined by the haze value, for example. The specific haze value of the light-scattering members 2b and 2c may be appropriately determined based on the number of rod-shaped light sources 1, the distance between the rod-shaped light sources 1, the brightness of each rod-shaped light source 1, etc.

Figure 34:
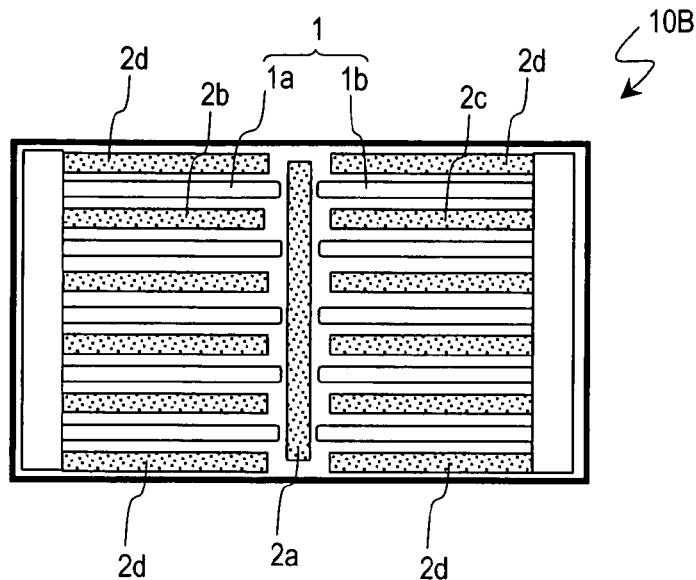
FIG. 34 is a plan view schematically illustrating the illuminator 10B according to a preferred embodiment of the present invention.

In the present preferred embodiment of the present invention, the light-scattering member is preferably provided only between two adjacent first light sources 1a and between two adjacent second light sources 1b. Alternatively, additional light-scattering members may be provided in order to realize an even more uniform brightness distribution. For example, the light-scattering member 2a may be provided between the first light sources 1a and the second light sources 1b, as illustrated in FIG. 34, thereby increasing the brightness in the area between the first light sources 1a and the second light sources 1b. Moreover, if light-scattering members 2d are provided on the outer side of the first and second light sources 1a and 1b, as illustrated in FIG. 34, it is possible to increase the brightness along the edges of the illuminator 10B. The light-scattering members 2d may have the same structure as the light-scattering members 2a and the light-scattering members 2b and 2c.

Figure 35:
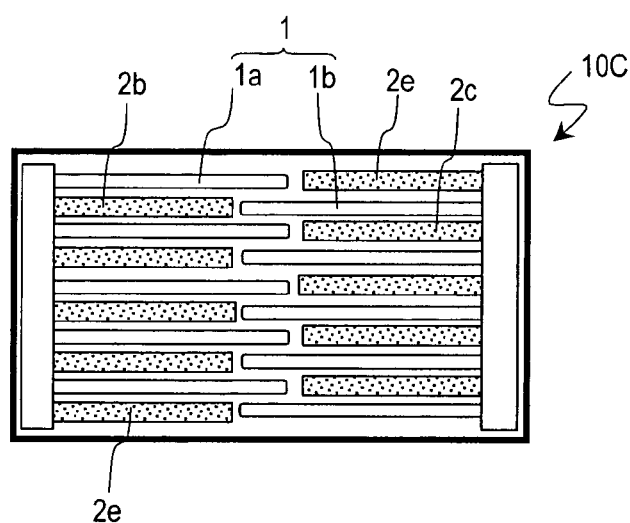
FIG. 35 is a plan view schematically illustrating still another illuminator 10C according to a preferred embodiment of the present invention.
Figure 36:
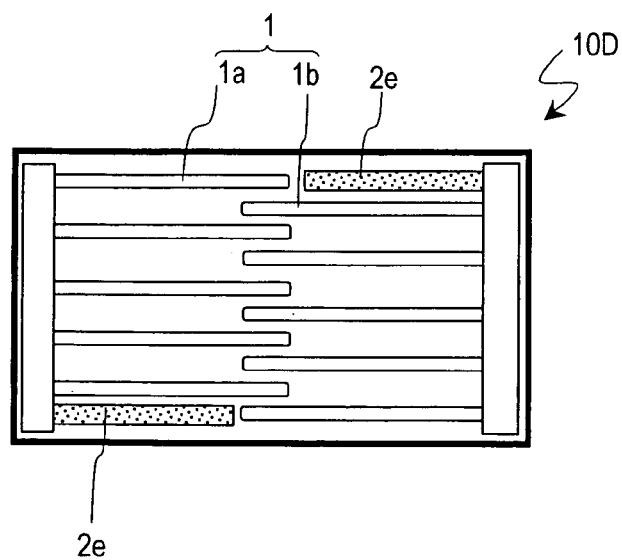
FIG. 36 is a plan view schematically illustrating schematically illustrating still another illuminator 10D according to a preferred embodiment of the present invention.

Another illuminator of the present preferred embodiment will now be described. FIG. 35 and FIG. 36 schematically illustrate illuminators 10C and 10D of the present preferred embodiment.

The illuminator 10C illustrated in FIG. 35 differs from the illuminator 10A of the second preferred embodiment in that the illuminator 10C includes the light-scattering members 2b each provided between two adjacent first light sources 1a and the light-scattering members 2c each provided between two adjacent second light sources 1b and in that the illuminator 10C includes a light-scattering member 2e (shown in the lower left side of FIG. 35) provided on the outer side of the first light source 1a and another light-scattering member 2e (shown in the upper right side of FIG. 35) provided on the outer side of the second light source 1b.

Moreover, the illuminator 10D illustrated in FIG. 36 differs from the illuminator 10A in that the illuminator 10D includes the light-scattering member 2e provided on the outer side of the first light source 1a and the light-scattering member 2e provided on the outer side of the second light source 1b.

Also in the illuminator 10C, the light-scattering members 2b and 2c each provided between two rod-shaped light sources 1 adjacent to each other in the second direction function as pseudo light sources, whereby it is possible to realize an optical system similar to those realized with a larger number of rod-shaped light sources 1 arranged at shorter intervals, thus reducing the brightness non-uniformity not only in the normal direction but also in inclined directions.

Moreover, the light-scattering members 2e provided on the outer side of the first and second light sources 1a and 1b in the illuminator 10C and the illuminator 10D function to increase the brightness along the edges of the illuminators 10C and 10D and increase the uniformity and the brightness of the output light.

As described above, various preferred embodiments of the present invention provides an illuminator that can suitably be used as a backlight for a large-size display device, and a display device using the same. The present invention is particularly useful as a backlight for a liquid crystal display device.

While the present invention has been described in preferred embodiments, it will be apparent to those skilled in the art that the disclosed invention may be modified in numerous ways and may assume many embodiments other than those specifically set out and described above. Accordingly, it is intended that the appended claims cover all modifications of the invention which fall within the true spirit and scope of the invention.

This non-provisional application claims priority under 35 USC §119(a) on Patent Applications No. 2003-404815 filed in Japan on Dec. 3, 2003 and No. 2004-323858 filed in Japan on Nov. 8, 2004 the entire contents of which are hereby incorporated by reference.

What is claimed is:

1. An illuminator for a display device, the illuminator comprising:
a plurality of rod-shaped light sources arranged along an inner periphery of the illuminator, each of the rod-shaped light sources having a length extending in a first direction and having substantially the same length; wherein
the plurality of rod-shaped light sources include a plurality of first rod-shaped light sources arranged to be substantially parallel with respect to one another and spaced from each other in a second direction that is substantially perpendicular to the first direction, and a plurality of second rod-shaped light sources arranged to be substantially parallel with respect to one another and spaced from each other in the second direction, each of the second rod-shaped light sources being arranged to be spaced from and collinear with a corresponding one of the plurality of first rod-shaped light sources along the first direction;
each of the first rod-shaped light sources has substantially the same length as the first rod-shaped light sources that are directly adjacent thereto in the second direction, and each of the second rod-shaped light sources has substantially the same length as the second rod-shaped light sources that are directly adjacent thereto in the second direction; and
the only light sources provided in the illuminator are the plurality of first rod-shaped light sources and the plurality of second rod-shaped light sources.

2. The illuminator according to claim 1, wherein the first rod-shaped light sources are arranged in a first half of the illuminator and the second rod-shaped light sources are arranged in a second half of the illuminator, and a central region of the illuminator being disposed between the first and second halves of the illuminator.

3. The illuminator according to claim 2, further comprising at least one inverter disposed in said central region.

4. The illuminator according to claim 2, wherein the first rod-shaped light sources have first ends that are aligned with each other at a left edge portion of the illuminator and second ends that are aligned with each other at said central region of the illuminator, and the second rod-shaped light sources have first ends that are aligned with each other at said central region of the illuminator and second ends that are aligned with each other at a right edge of the illuminator.

5. The illuminator according to claim 1, wherein all of the rod-shaped light sources contained in the illuminator have exactly the same length.

6. The illuminator according to claim 1, further comprising a first supporting member arranged to support ends of the plurality of first rod-shaped light sources on one side that is closer to the plurality of second rod-shaped light sources and a second supporting member arranged to support ends of the plurality of second rod-shaped light sources on one side that is closer to the plurality of first rod-shaped light sources, wherein the first supporting member and the second supporting member are each made of a light-transmitting material.

7. The illuminator according to claim 1, further comprising a light-scattering member that is arranged between the plurality of first rod-shaped light sources and the plurality of second rod-shaped light sources.

8. The illuminator according to claim 1, wherein each of the plurality of rod-shaped light sources is a fluorescent tube.

9. The illuminator according to claim 8, further comprising a plurality of inverters provided between the plurality of first rod-shaped light sources and the plurality of second rod-shaped light sources to operate the plurality of first rod-shaped light sources and the plurality of second rod-shaped light sources.

10. The illuminator according to claim 8, wherein at least two of the plurality of rod-shaped light sources are electrically connected to each of the plurality of inverters.

11. The illuminator according to claim 10, wherein the at least two rod-shaped light sources electrically connected to each of the plurality of inverters include two rod-shaped light sources electrically connected in series with each other.

12. The illuminator according to claim 10, wherein the at least two rod-shaped light sources electrically connected to each of the plurality of inverters include two rod-shaped light sources electrically connected in parallel to each other.

13. The illuminator according to claim 1, further comprising at least one inverter, wherein a potential applied by said at least one inverter to ends of the plurality of first rod-shaped light sources on one side that is closer to the plurality of second rod-shaped light sources and a potential applied by said at least one inverter to ends of the plurality of second rod-shaped light sources on one side that is closer to the plurality of first rod-shaped light sources are substantially the same.

14. The illuminator according to claim 1, further comprising:
   a first light-scattering member provided between two adjacent ones of the plurality of first rod-shaped light sources; and
   a second light-scattering member provided between two adjacent ones of the plurality of second rod-shaped light sources.

15. The illuminator according to claim 14, wherein the first light-scattering member is located generally in a middle region between the two first rod-shaped light sources, and the second light-scattering member is located generally in a middle region between the two second rod-shaped light sources.

16. The illuminator according to claim 14, wherein the first light-scattering member and the second light-scattering member are rod-shaped members.

17. The illuminator according to claim 14, wherein the first light-scattering member is arranged to be substantially parallel to the plurality of first rod-shaped light sources, and the second light-scattering member is arranged to be substantially parallel to the plurality of second rod-shaped light sources.

18. The illuminator according to claim 14, wherein a central axis of the first light-scattering member is substantially coplanar with central axes of the plurality of first rod-shaped light sources, and a central axis of the second light-scattering member is substantially coplanar with central axes of the plurality of second rod-shaped light sources.

19. The illuminator according to claim 14, wherein the first light-scattering member has substantially the same outer diameter as that of the plurality of first rod-shaped light sources, and the second light-scattering member has substantially the same outer diameter as that of the plurality of second rod-shaped light sources.

20. The illuminator according to claim 14, wherein a shape of a cross section of the first light-scattering member in the second direction is generally the same as that of each of the plurality of first rod-shaped light sources, and a shape of a cross section of the second light-scattering member in the second perpendicular to the first direction is generally the same as that of each of the plurality of second rod-shaped light sources.

21. The illuminator according to claim 14, wherein a shape of a cross section of the first light-scattering member in the second direction and that of the second light-scattering member are generally circular.

22. A display device, comprising a display panel for modulating light for displaying an image, and the illuminator according to claim 1 provided on a back side of the display panel.

23. The display device according to claim 22, wherein the display panel is a liquid crystal display panel including a pair of substrates and a liquid crystal layer provided between the pair of substrates.

24. An illuminator for a display device comprising:
   a plurality of rod-shaped light sources each having a length extending in a first direction and having substantially the same length; wherein
   the plurality of rod-shaped light sources include a plurality of first rod-shaped light sources arranged to be substantially parallel with respect to one another and spaced from each other in a second direction that is substantially perpendicular to the first direction, and a plurality of second rod-shaped light sources arranged to be substantially parallel with respect to one another and spaced from each other in the second direction, respective end portions of a plurality of pairs of the first and second rod-shaped light sources that are directly adjacent to each other along the second direction are overlapped with each other by a certain amount along the first direction, and the overlapping end portions of the plurality of pairs of the first and second rod-shaped light sources being the only overlapping portions of the plurality of pairs of the first and second rod-shaped light sources;
   each of the plurality of rod-shaped light sources includes a light-emitting region where light is emitted and two non-light-emitting regions where light is not substantially emitted, the non-light-emitting regions being adjacent respectively to opposite ends of the light-emitting region; and
   a boundary between the light-emitting regions of the plurality of first rod-shaped light sources and the non-light-emitting regions thereof on one side that is closer to the plurality of second rod-shaped light sources is substantially collinear along the second direction with a boundary between the light-emitting regions of the plurality of second rod-shaped light sources and the non-light-emitting regions thereof on one side that is closer to the plurality of first rod-shaped light sources.

25. The illuminator according to claim 24, wherein the only overlapping portions of the plurality of pairs of first and second rod-shaped light sources are located only within a central region of the illuminator.

26. The illuminator according to claim 25, wherein the first rod-shaped light sources are arranged in a first half of the illuminator and have end portions extending into said central region of the illuminator, and the second rod-shaped light sources are arranged in a second half of the illuminator and have end portions extending into said central region of the illuminator.

27. The illuminator according to claim 25, further comprising at least one inverter disposed in said central region of the illuminator.

28. The illuminator according to claim 25, wherein the first rod-shaped light sources have first ends that are aligned with each other at a left edge portion of the illuminator and second ends that extend into said central region of the illuminator, and the second rod-shaped light sources have first ends that extend into said central region of the illuminator and second ends that are aligned with each other at a right edge of the illuminator.

29. The illuminator according to claim 24, wherein all of the rod-shaped light sources contained in the illuminator have exactly the same length.

30. The illuminator according to claim 24, further comprising a first supporting member arranged to support ends of the plurality of first rod-shaped light sources on one side that is closer to the plurality of second rod-shaped light sources and a second supporting member arranged to support ends of the plurality of second rod-shaped light sources on one side that is closer to the plurality of first rod-shaped light sources, wherein the first supporting member and the second supporting member are each made of a light-transmitting material.

31. The illuminator according to claim 24, wherein the plurality of first rod-shaped light sources are spaced from one another in the second direction by a constant pitch P, and the plurality of second rod-shaped light sources are spaced from one another in the second direction by the pitch P.

32. The illuminator according to claim 31, wherein each of said plurality of pairs of the first and second rod-shaped light sources that are directly adjacent to each other along the second direction are spaced from each other in the second direction by an amount that is substantially equal to one half of the pitch P.

33. The illuminator according to claim 24, wherein an amount of overlap of the respective end portions of each of the plurality of the first and second rod-shaped light sources that are directly adjacent to each other along the second direction is less than the length of each of the plurality of first rod-shaped light sources.

34. The illuminator according to claim 33, wherein
the non-light-emitting regions of the plurality of first rod-shaped light sources on one side that is closer to the plurality of second rod-shaped light sources are not facing the non-light-emitting regions of the plurality of second rod-shaped light sources on one side that is closer to the plurality of first rod-shaped light sources.

35. The illuminator according to claim 24, further comprising a light-scattering member arranged between the plurality of first rod-shaped light sources and the plurality of second rod-shaped light sources.

36. The illuminator according to claim 24, wherein each of the plurality of rod-shaped light sources is a fluorescent tube.

37. The illuminator according to claim 36, further comprising a plurality of inverters provided between the plurality of first rod-shaped light sources and the plurality of second rod-shaped light sources to operate the plurality of first rod-shaped light sources and the plurality of second rod-shaped light sources.

38. The illuminator according to claim 37, wherein at least two of the plurality of rod-shaped light sources are electrically connected to each of the plurality of inverters.

39. The illuminator according to claim 38, wherein the at least two rod-shaped light sources electrically connected to each of the plurality of inverters include two rod-shaped light sources electrically connected in series with each other.

40. The illuminator according to claim 38, wherein the at least two rod-shaped light sources electrically connected to each of the plurality of inverters include two rod-shaped light sources electrically connected in parallel to each other.

41. The illuminator according to claim 24, further comprising at least one inverter, wherein a potential applied by said at least one inverter to ends of the plurality of first rod-shaped light sources on one side that is closer to the plurality of second rod-shaped light sources and a potential applied by said at least one inverter to ends of the plurality of second rod-shaped light sources on one side that is closer to the plurality of first rod-shaped light sources are substantially the same.

42. The illuminator according to claim 24, further comprising:
a first light-scattering member provided between two adjacent ones of the plurality of first rod-shaped light sources; and
a second light-scattering member provided between two adjacent ones of the plurality of second rod-shaped light sources.

43. The illuminator according to claim 42, wherein the first light-scattering member is located generally in a middle region between the two first rod-shaped light sources, and the second light-scattering member is located generally in a middle region between the two second rod-shaped light sources.

44. The illuminator according to claim 42, wherein the first light-scattering member and the second light-scattering member are rod-shaped members.

45. The illuminator according to claim 42, wherein the first light-scattering member is arranged to be substantially parallel to the plurality of first rod-shaped light sources, and the second light-scattering member is arranged to be substantially parallel to the plurality of second rod-shaped light sources.

46. The illuminator according to claim 42, wherein a central axis of the first light-scattering member is substantially coplanar with central axes of the plurality of first rod-shaped light sources, and a central axis of the second light-scattering member is substantially coplanar with central axes of the plurality of second rod-shaped light sources.

47. The illuminator according to claim 42, wherein the first light-scattering member has substantially the same outer diameter as that of the plurality of first rod-shaped light sources, and the second light-scattering member has substantially the same outer diameter as that of the plurality of second rod-shaped light sources.

48. The illuminator according to claim 42, wherein a shape of a cross section of the first light-scattering member in the second direction is generally the same as that of each of the plurality of first rod-shaped light sources, and a shape of a cross section of the second light-scattering member in the second perpendicular to the first direction is generally the same as that of each of the plurality of second rod-shaped light sources.

49. The illuminator according to claim 42, wherein a shape of a cross section of the first light-scattering member in the second direction and that of the second light-scattering member are generally circular.

50. A display device, comprising a display panel for modulating light for displaying an image, and the illuminator according to claim 24 provided on a back side of the display panel.

51. The display device according to claim 50, wherein the display panel is a liquid crystal display panel including a pair of substrates and a liquid crystal layer provided between the pair of substrates.

52. An illuminator for a display device comprising:
a plurality of rod-shaped light sources each having a length extending in a first direction, the plurality of rod-shaped light sources include a plurality of first rod-shaped light sources arranged to be substantially parallel with respect to one another and spaced from each other in a second direction that is substantially perpendicular to the first direction, and a plurality of second rod-shaped light sources arranged to be substantially parallel with respect to one another and spaced from each other in the second direction, the first rod-shaped light sources having ends aligned along the second direction at a first edge of the illuminator and a remaining portion of the first rod-shaped light sources extending along the first direction toward a central region of the illuminator, the second rod-shaped light sources having ends aligned along the second direction at a second edge of the illuminator and a remaining portion of the second rod-shaped light sources extending along the first direction toward said central region of the illuminator;
all of the rod-shaped light sources contained in the illuminator have substantially the same length; and
a first supporting member arranged to support ends of the plurality of first rod-shaped light sources on one side that is closer to the plurality of second rod-shaped light sources and a second supporting member arranged to support ends of the plurality of second rod-shaped light sources on one side that is closer to the plurality of first rod-shaped light sources, wherein the first supporting member and the second supporting member are each made of a light-transmitting material.

53. The illuminator according to claim 52, wherein each of the second rod-shaped light sources is spaced from and collinear with a corresponding one of the plurality of first rod-shaped light sources along the first direction.

54. The illuminator according to claim 52, wherein additional ends of the first rod-shaped light sources are aligned at said central region of the illuminator, and additional ends of the second rod-shaped light sources are aligned at said central region and spaced from said additional ends of the first rod-shaped light sources along the first direction.

55. The illuminator according to claim 52, wherein additional end portions of a plurality of pairs of the first and second rod-shaped light sources that are directly adjacent to each other along the second direction are overlapped with each other by a certain amount along the first direction, and the overlapping end portions of the plurality of pairs of the first and second rod-shaped light sources being the only overlapping portions of the plurality of pairs of the first and second rod-shaped light sources.

56. The illuminator according to claim 52, further comprising at least one inverter disposed in said central region of the illuminator.

* * * * *